US012638302B2

(12) United States Patent
Yoshida et al.

(10) Patent No.: US 12,638,302 B2
(45) Date of Patent: May 26, 2026

(54) ROAD BOUNDARY DETECTION DEVICE, ROAD BOUNDARY DETECTION METHOD, AND ROAD BOUNDARY DETECTION PROGRAM

(71) Applicant: NTT, Inc., Tokyo (JP)

(72) Inventors: Taiga Yoshida, Tokyo (JP); Yasuhiro Yao, Tokyo (JP); Naoki Ito, Tokyo (JP); Jun Shimamura, Tokyo (JP)

(73) Assignee: NTT, Inc., Tokyo (JP)

( * ) Notice: Subject to any disclaimer, the term of this patent is extended or adjusted under 35 U.S.C. 154(b) by 25 days.

(21) Appl. No.: 18/717,379

(22) PCT Filed: Dec. 8, 2021

(86) PCT No.: PCT/JP2021/045205
§ 371 (c)(1),
(2) Date: Jun. 6, 2024

(87) PCT Pub. No.: WO2023/105693
PCT Pub. Date: Jun. 15, 2023

(65) Prior Publication Data
US 2025/0052590 A1 Feb. 13, 2025

(51) Int. Cl.
*G01C 21/00* (2006.01)

(52) U.S. Cl.
CPC ................................. *G01C 21/3819* (2020.08)

(58) Field of Classification Search
CPC ............................. G01C 21/3819; G08G 1/16
(Continued)

(56) References Cited

U.S. PATENT DOCUMENTS

2020/0074848 A1    3/2020  Namba
2021/0247771 A1    8/2021  Watanabe et al.

FOREIGN PATENT DOCUMENTS

JP        2020038500 A        3/2020
JP        2020166516 A       10/2020
WO     WO-2020080088 A1 *    4/2020    ......... G01C 21/3848

OTHER PUBLICATIONS

Zai et al. (2018) "3-D Road Boundary Extraction From Mobile Laser Scanning Data via Supervoxels and Graph Cuts" IEEE Transactions on Intelligent Transportation Systems, vol. 19, No. 3, pp. 802-813.
(Continued)

*Primary Examiner* — Maceeh Anwari

(57) ABSTRACT

A road boundary detection device is a road boundary detection device that acquires a set of lines corresponding to a road boundary from point cloud data as road boundary information. The road boundary detection device includes: a candidate point detection unit that detects each point of road boundary candidates corresponding to candidates of a road boundary from the point cloud data; a candidate point clustering unit that clusters each point of the road boundary candidates; an adjacent cluster reduction unit that reduces a cluster from a distribution of points in clusters in an adjacency relationship by using a predetermined cluster reduction method; a line fitting unit that fits one or more straight lines or curved lines to one or more of the clusters and output fitted lines as road boundary candidates; a line connecting unit that connects some of the fitted lines by using a predetermined analysis method; and an information output unit that outputs a calculated line as the road boundary information.

20 Claims, 22 Drawing Sheets

(58) Field of Classification Search
    USPC ........................................................ 701/450
    See application file for complete search history.

(56)                    References Cited

OTHER PUBLICATIONS

Felzenszwalb et al. (2004) "Efficient Graph-Based Image Segmentation" International Journal of Computer Vision, vol. 59, No. 2, pp. 167-181.
Edelsbrunner et al. (1983) "On the Shape of a Set of Points in the Plane" IEEE Transactions on Information Theory, vol. IT-29, No. 4, pp. 551-559.

* cited by examiner

Fig. 4

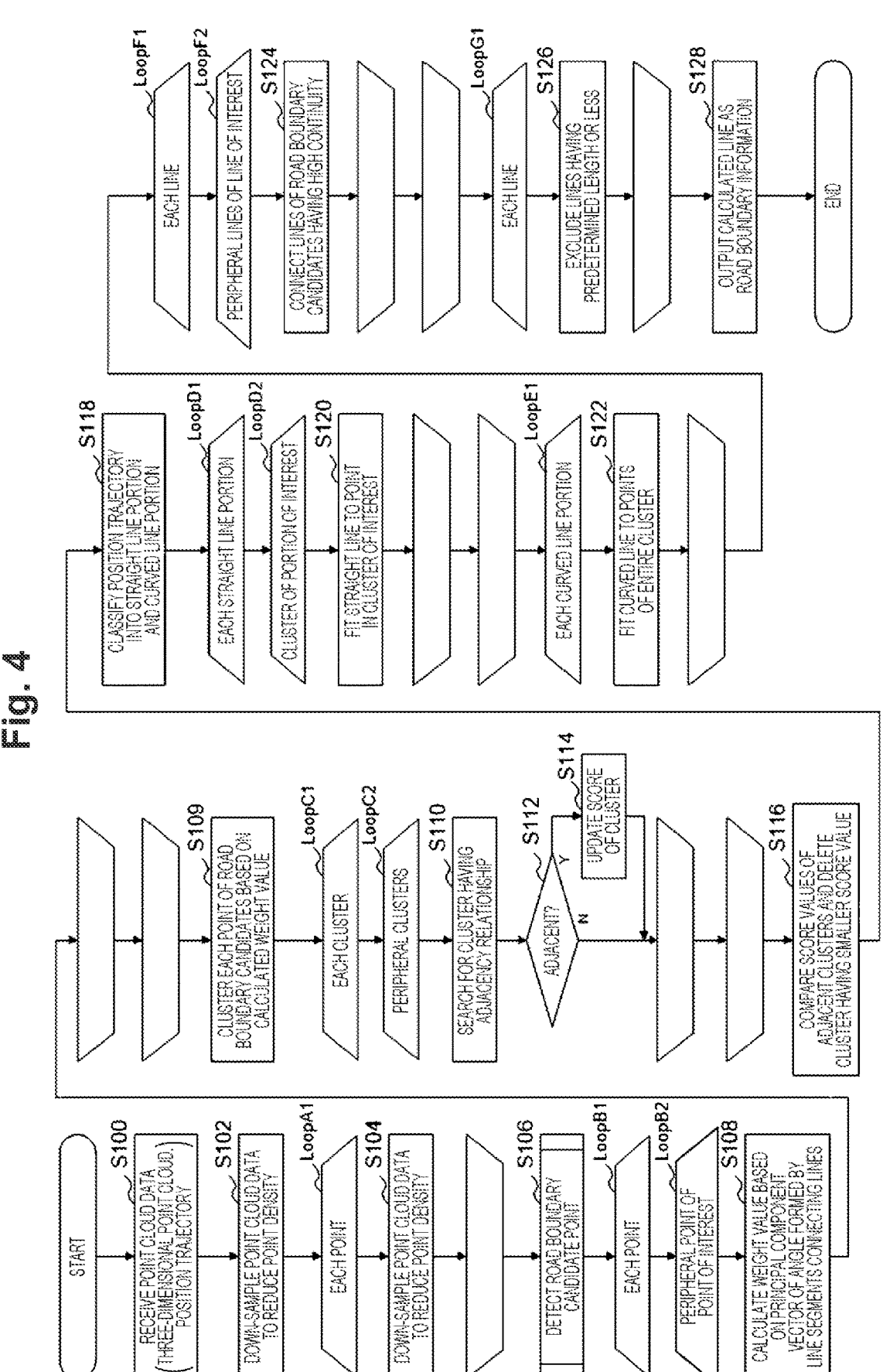

START

RECEIVE POINT CLOUD DATA
(THREE-DIMENSIONAL POINT CLOUD,
POSITION TRAJECTORY) — S100

DOWN-SAMPLE POINT CLOUD DATA
TO REDUCE POINT DENSITY — S102

LoopA1

EACH POINT

DOWN-SAMPLE POINT CLOUD DATA
TO REDUCE POINT DENSITY — S104

DETECT ROAD BOUNDARY
CANDIDATE POINT — S106

LoopB1

EACH POINT

LoopB2

PERIPHERAL POINT OF
POINT OF INTEREST

CALCULATE WEIGHT VALUE BASED
ON PRINCIPAL COMPONENT
VECTOR OF ANGLE FORMED BY
LINE SEGMENTS CONNECTING LINES — S108

S109

CLUSTER EACH POINT OF ROAD
BOUNDARY CANDIDATES BASED ON
CALCULATED WEIGHT VALUE

LoopC1

EACH CLUSTER

LoopC2

PERIPHERAL CLUSTERS

SEARCH FOR CLUSTER HAVING
ADJACENCY RELATIONSHIP — S110

ADJACENT? — S112

Y → UPDATE SCORE
OF CLUSTER — S114

N

COMPARE SCORE VALUES OF
ADJACENT CLUSTERS AND DELETE
CLUSTER HAVING SMALLER SCORE VALUE — S116

CLASSIFY POSITION TRAJECTORY
INTO STRAIGHT LINE PORTION
AND CURVED LINE PORTION — S118

LoopD1

EACH STRAIGHT LINE PORTION

LoopD2

CLUSTER OF PORTION OF INTEREST

FIT STRAIGHT LINE TO POINT
IN CLUSTER OF INTEREST — S120

LoopE1

EACH CURVED LINE PORTION

FIT CURVED LINE TO POINTS
OF ENTIRE CLUSTER — S122

LoopF1

EACH LINE

LoopF2

PERIPHERAL LINES OF LINE OF INTEREST

CONNECT LINES OF ROAD BOUNDARY
CANDIDATES HAVING HIGH CONTINUITY — S124

LoopG1

EACH LINE

EXCLUDE LINES HAVING
PREDETERMINED LENGTH OR LESS — S126

OUTPUT CALCULATED LINE AS
ROAD BOUNDARY INFORMATION — S128

END

Fig. 5C
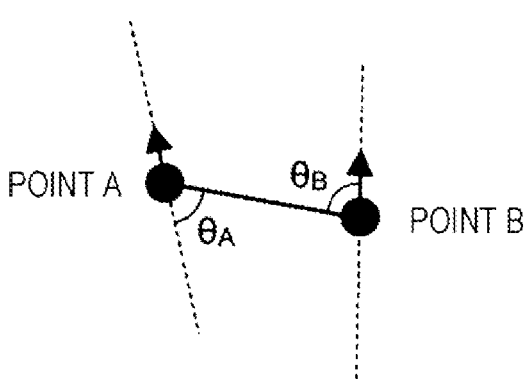
$$EDGE\ WEIGHT = \frac{\theta_A + \theta_B}{2}$$
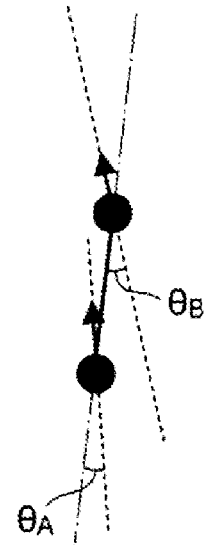

LINE SEGMENT
CONNECTING TWO END POINTS
OF CLUSTER C

LINE SEGMENT
CONNECTING TWO END POINTS
OF CLUSTER A

LINE SEGMENT
CONNECTING TWO END POINTS
OF CLUSTER B

LINE SEGMENT
CONNECTING TWO END POINTS
OF CLUSTER A

ADJACENT EXAMPLE                    NON-ADJACENT EXAMPLE

Fig. 8A

Fig. 9A
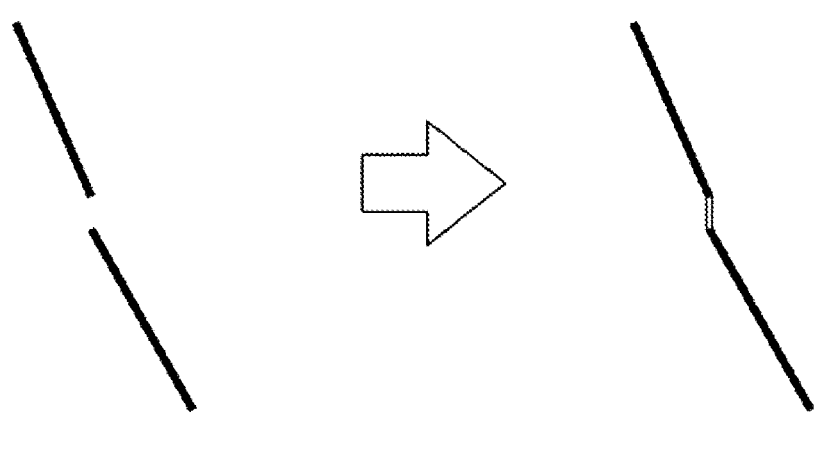
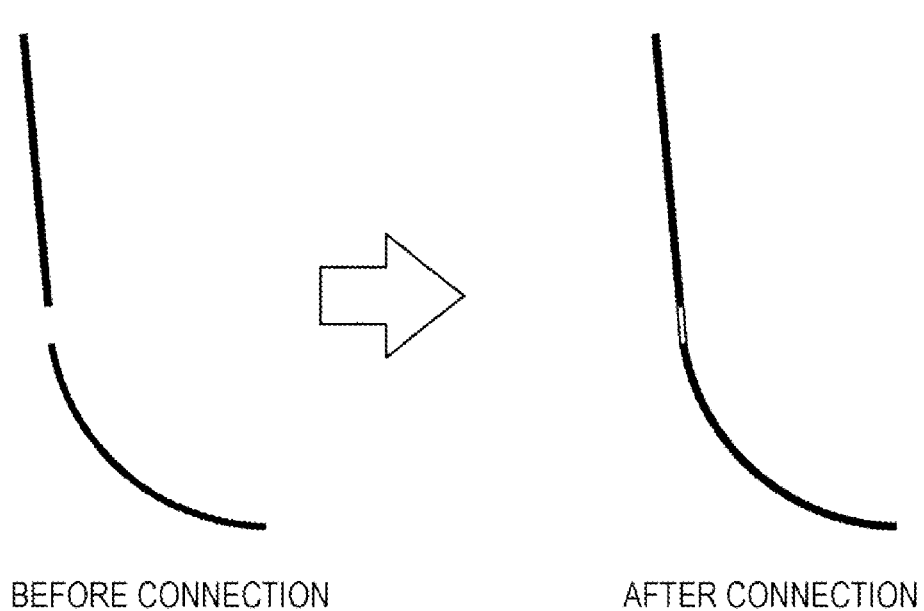
BEFORE CONNECTION                    AFTER CONNECTION Fig. 11B
(1)
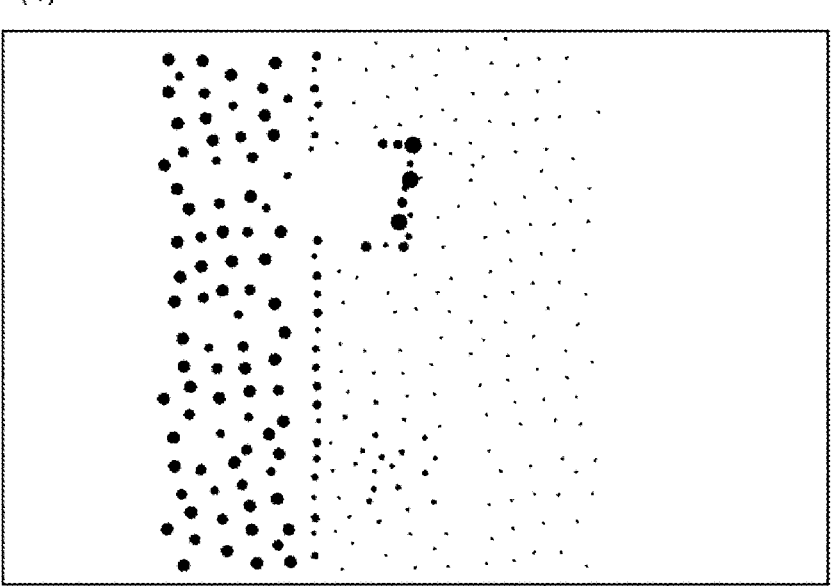
(2)
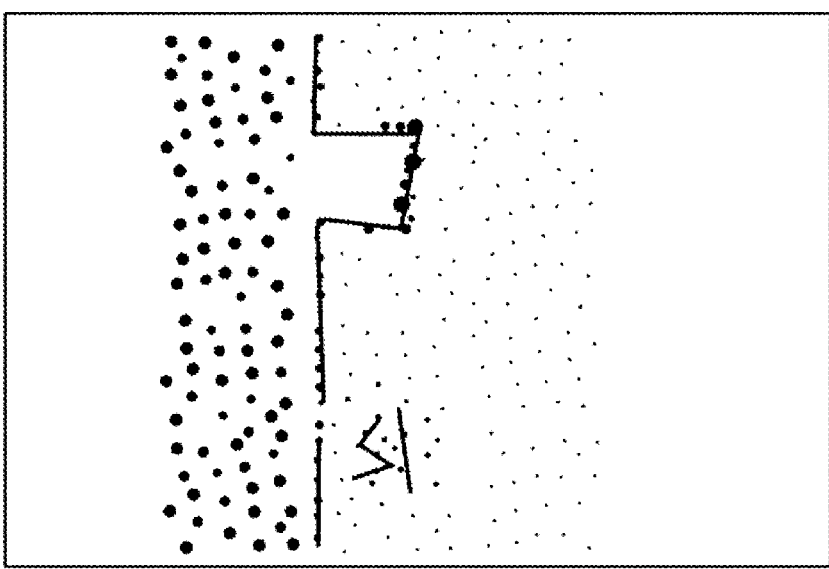

ROAD BOUNDARY DETECTION DEVICE, ROAD BOUNDARY DETECTION METHOD, AND ROAD BOUNDARY DETECTION PROGRAM

CROSS-REFERENCE TO RELATED APPLICATIONS

This application is a U.S. 371 Application of International Patent Application No. PCT/JP2021/045205, filed on 8 Dec. 2021, the disclosure of which is hereby incorporated herein by reference in its entirety.

TECHNICAL FIELD

The disclosed technique relates to a road boundary detection device, a road boundary detection method, and a road boundary detection program. In particular, the present technique is a technique for extracting points corresponding to road boundaries from point cloud data and expressing the extracted points as lines.

BACKGROUND ART

There is a device called a mobile mapping system (MMS) that acquires shape data in a three-dimensional space by mounting various measuring devices in a vehicle. Point cloud data can be acquired by using a LiDAR (light detection and ranging, laser imaging detection and ranging) as a measuring device, and three-dimensional point cloud information of a space can be acquired by combining the point cloud data with position information acquired by the Global Positioning System (GPS) or the like.

By analyzing the acquired three-dimensional point cloud information, it is possible to acquire an accurate position of a structure on the ground and construct a three-dimensional map with high accuracy. As a technique for detecting a road boundary representing a step due to a curbstone or the like between a roadway and a sidewalk, for example, there is a technique disclosed in Non Patent Literature 1.

When the technique of Non Patent Literature 1 is applied to a point cloud measured on a vehicle parked on a road or a road without fine undulations, it is possible to detect a point corresponding to a road boundary with high accuracy, fit a line by curve fitting, and acquire a line representing the road boundary.

CITATION LIST

Non Patent Literature

Non Patent Literature 1: ZAI, Dawei, et al. 3-D road boundary extraction from mobile laser scanning data via supervoxels and graph cuts. IEEE Transactions on Intelligent Transportation Systems, 2017, 19.3:802-813.

SUMMARY OF INVENTION

Technical Problem

In the technique disclosed in Non Patent Literature 1, in a case where there is an object that shields a laser from a LiDAR, such as a vehicle parked on a road, as illustrated in FIG. 11A, a point cloud of a vehicle portion is erroneously detected as a road boundary, and a wrong line is acquired. In addition, in a case where the road surface of the roadway is rough and has fine undulations, a point extracted from a raised portion is recognized as a step, and a line is applied to a position different from the original road boundary, which causes a decrease in accuracy. (1) of FIG. 11B is an image of the acquired point cloud, and a higher point is displayed larger. (2) of FIG. 11B is an image of a result of fitting a line to the road boundary.

The disclosed technique has been made in view of the above circumstances, and involves performing processing using point cloud data to remove a line erroneously detected in a case where there is a shielding object such as an on-road parked vehicle on a roadway and to analyze a height difference robustly even in a case where there is fine undulation on the roadway. Accordingly, an object of the disclosed technique is to provide a road boundary detection device, a road boundary detection method, and a road boundary detection program capable of acquiring a line corresponding to a road boundary with high accuracy.

Solution to Problem

A first aspect of a road boundary detection device of the present disclosure is a road boundary detection device that acquires a set of lines corresponding to a road boundary from point cloud data as road boundary information, the road boundary detection device including: a candidate point detection unit configured to detect each point of road boundary candidates corresponding to candidates of a road boundary from the point cloud data; a candidate point clustering unit configured to cluster each point of the road boundary candidates; an adjacent cluster reduction unit configured to reduce a cluster from a distribution of points in clusters in an adjacency relationship by using a predetermined cluster reduction method; a line fitting unit configured to fit one or more straight lines or curved lines to one or more of the clusters and output fitted lines as road boundary candidates; a line connecting unit configured to connect some of the fitted lines by using a predetermined analysis method; and an information output unit configured to output a calculated line as the road boundary information.

Further, a second aspect of the road boundary detection device is a road boundary detection device that acquires a set of lines corresponding to a road boundary from point cloud data as road boundary information, the road boundary detection device including: a point cloud density reduction unit configured to down-sample the point cloud data to reduce density; a candidate point detection unit configured to detect each point of road boundary candidates corresponding to candidates of a road boundary from the reduced point cloud data; a candidate point clustering unit configured to cluster each point of the road boundary candidates; an adjacent cluster reduction unit configured to reduce a cluster from a distribution of points in clusters in an adjacency relationship by using a predetermined cluster reduction method; a line fitting unit configured to fit one or more straight lines or curved lines to one or more of the clusters and output fitted lines as road boundary candidates; a line connecting unit configured to connect some of the fitted lines by using a predetermined analysis method; and an information output unit configured to output a calculated line as the road boundary information.

A road boundary detection method of the present disclosure is a road boundary detection method for acquiring, by a computer, a set of lines corresponding to a road boundary from point cloud data as road boundary information, the road boundary detection method causing the computer to execute processing of: detecting each point of road boundary candidates corresponding to candidates of a road boundary from the point cloud data; clustering each point of the road boundary candidates; reducing a cluster from a distribution of points in clusters in an adjacency relationship by using a predetermined cluster reduction method; fitting one or more straight lines or curved lines to one or more of the clusters and outputting fitted lines; connecting some of the fitted lines; and outputting a calculated line as the road boundary information.

A road boundary detection program of the present disclosure is a road boundary detection program for acquiring a set of lines corresponding to a road boundary from point cloud data as road boundary information, the road boundary detection program causing a computer to execute processing of: detecting each point of road boundary candidates corresponding to candidates of a road boundary from the point cloud data; clustering each point of the road boundary candidates; reducing a cluster from a distribution of points in clusters in an adjacency relationship by using a predetermined cluster reduction method; fitting one or more straight lines or curved lines to one or more of the clusters and outputting fitted lines; connecting some of the fitted lines; and outputting a calculated line as the road boundary information.

Advantageous Effects of Invention

According to the disclosed technique, a line corresponding to a road boundary can be acquired with high accuracy.

BRIEF DESCRIPTION OF DRAWINGS

FIG. 4 is a flowchart illustrating a flow of road boundary detection by the road boundary detection device.

FIG. 5C is an example related to clustering processing.

FIG. 8A is an example of fitting a line to a straight line portion.

FIG. 9A is an example of lines to be connected.

FIG. 11B is an image of a point cloud and an image of fitting a line to a road boundary.

DESCRIPTION OF EMBODIMENTS

Figure 1:
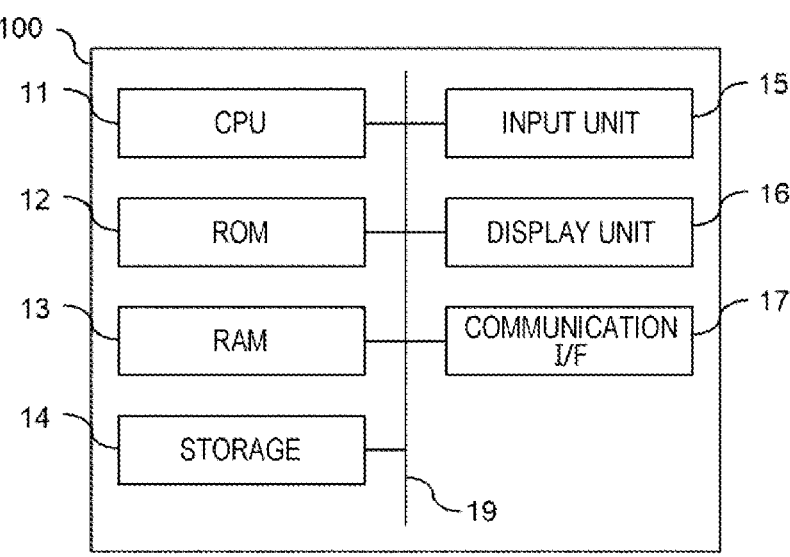
FIG. 1 is a block diagram illustrating a hardware configuration of a road boundary detection device.

An example of an embodiment of the disclosed technique will be described below with reference to the drawings. In the drawings, the same or equivalent components and portions are denoted by the same reference signs. Further, dimensional ratios in the drawings are exaggerated for convenience of description and thus may be different from actual ratios.

Hereinafter, a configuration of the present embodiment will be described.

FIG. 1 is a block diagram illustrating a hardware configuration of a road boundary detection device 100.

As illustrated in FIG. 1, the road boundary detection device 100 includes a central processing unit (CPU) 11, a read only memory (ROM) 12, a random access memory (RAM) 13, a storage 14, an input unit 15, a display unit 16, and a communication interface (I/F) 17. The components are communicatively connected to each other via a bus 19.

The CPU 11 is a central processing unit, which executes various programs and controls each unit. That is, the CPU 11 reads a program from the ROM 12 or the storage 14 and executes the program using the RAM 13 as a work area. The CPU 11 performs control of each of the components described above and various types of calculation processing according to a program stored in the ROM 12 or the storage 14. In the present embodiment, a road boundary detection program is stored in the ROM 12 or the storage 14.

The ROM 12 stores various programs and various types of data. The RAM 13 serving as a work area temporarily stores programs or data. The storage 14 includes a storage device such as a hard disk drive (HDD) or solid state drive (SSD) and stores various programs including an operating system and various types of data.

The input unit 15 includes a pointing device such as a mouse and a keyboard and is used to perform various inputs.

The display unit 16 is, for example, a liquid crystal display and displays various types of information. The display unit 16 may function as the input unit 15 by employing a touch panel system.

The communication interface 17 is an interface for communicating with another device such as a terminal. For the communication, for example, a wired communication standard such as Ethernet (registered trademark) or FDDI or a wireless communication standard such as 4G, 5G, or Wi-Fi (registered trademark) is used.

Figure 2:
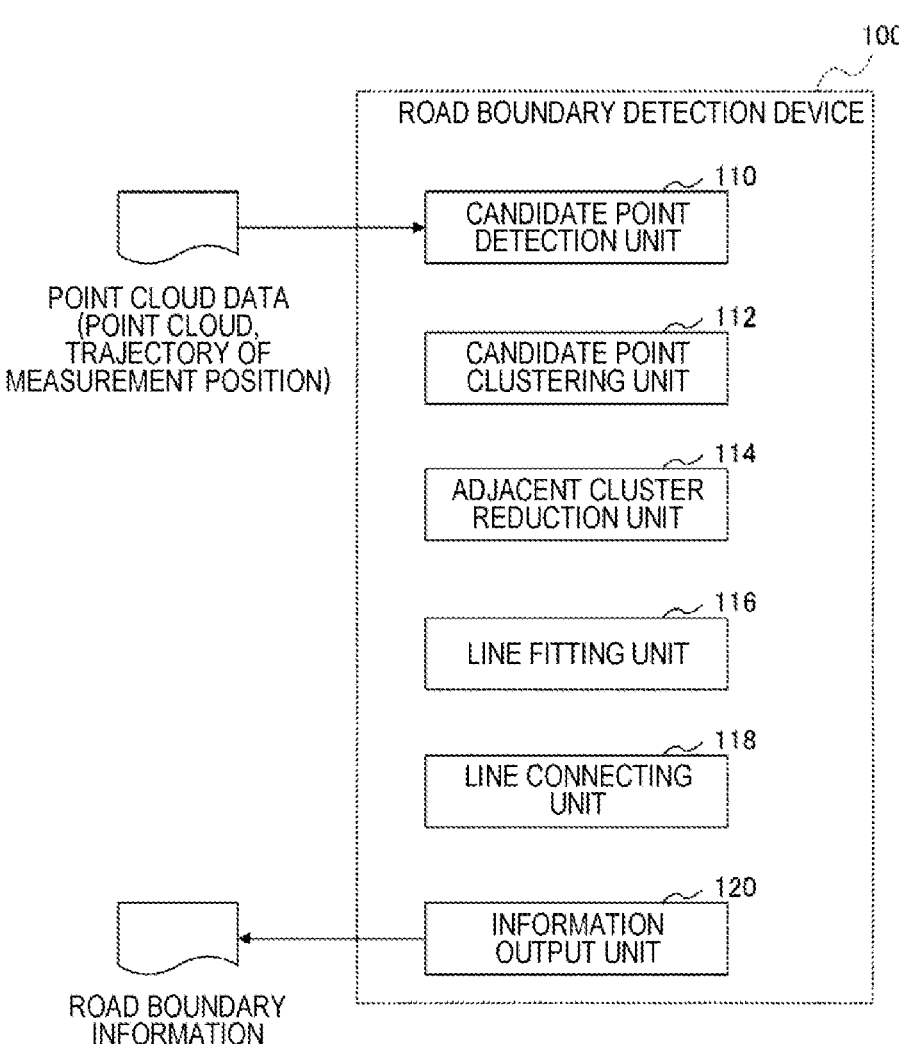
FIG. 2 is a block diagram illustrating a functional configuration of the road boundary detection device.

Next, each functional configuration of the road boundary detection device 100 will be described. FIG. 2 is a block diagram illustrating a functional configuration of the road boundary detection device of the present embodiment. Each functional configuration is achieved by the CPU 11 reading the road boundary detection program stored in the ROM 12 or the storage 14, loading the road boundary detection program in the RAM 13, and executing the road boundary detection program.

Figure 3:
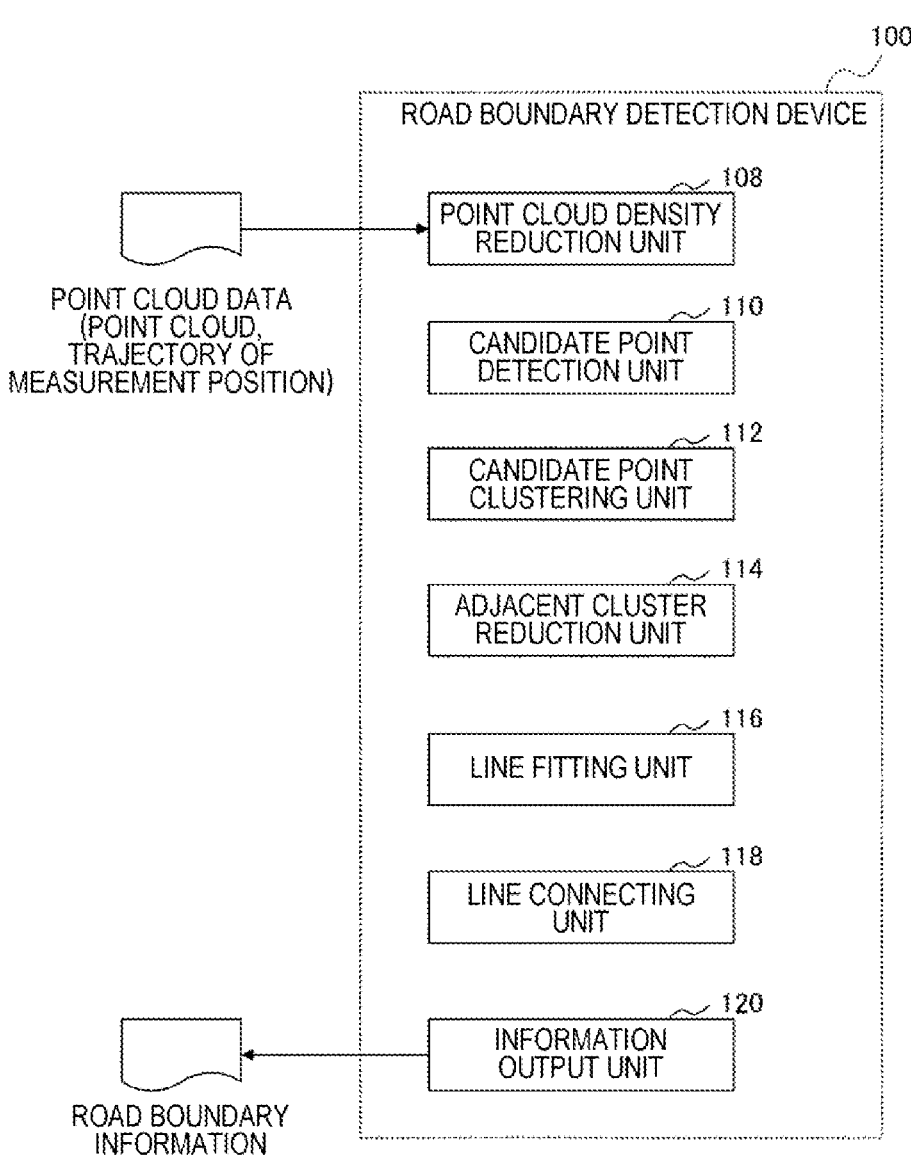
FIG. 3 is a block diagram illustrating a functional configuration of the road boundary detection device in which a point cloud density reduction unit is added.

As illustrated in FIG. 2, the road boundary detection device 100 includes a candidate point detection unit 110, a candidate point clustering unit 112, an adjacent cluster reduction unit 114, a line fitting unit 116, a line connecting unit 118, and an information output unit 120. The road boundary detection device 100 may additionally include a point cloud density reduction unit 108. FIG. 3 is a block diagram illustrating a functional configuration in a case where the point cloud density reduction unit 108 is added to the road boundary detection device 100. In the following description, it is assumed that the road boundary detection device 100 includes the point cloud density reduction unit 108. However, in a case where the road boundary detection device 100 does not include the point cloud density reduction unit 108, the point cloud data that is not down-sampled serves as an input of processing of each unit. Whether or not to include the point cloud density reduction unit 108 may be determined according to the noise situation of the sampled point cloud data.

The road boundary detection device 100 receives an input of point cloud data. The point cloud data is three-dimensional point cloud information acquired by a LiDAR or the like and information on a position trajectory of a measuring instrument that has measured the point cloud. It is assumed that the measuring instrument moves along the road substantially along the direction of the road boundary and performs measurement. Hereinafter, an outline of processing of each unit will be described, and details of the processing will be described in the following description of the operation.

The point cloud density reduction unit 108 reduces the point density of the input point cloud data by down-sampling and outputs the reduced point cloud data. Note that, for each partial space obtained by dividing the three-dimensional space in the point cloud data, in a case where the point density is equal to or less than a certain value, in a case where the height is equal to or higher than a certain value from the position of the measuring instrument, in a case where the distance is equal to or higher than a certain distance from the position information of the measuring instrument, or the like, the point in the partial space may be deleted on the basis of the point density or the position information and may not be used for the subsequent processing.

The candidate point detection unit 110 receives point cloud data as an input, extracts only the point considered to correspond to the road boundary using the road boundary candidate point detection technique, and outputs each point of the road boundary candidates. Any technique can be used as the road boundary candidate point detection technique, and for example, the technique of the road boundary candidate point detection disclosed in Non Patent Literature 1 can be used. A detailed processing routine of the road boundary candidate point detection will be described later.

The candidate point clustering unit 112 receives, as an input, a point cloud that is a road boundary candidate, clusters each point of the road boundary candidates such that points arranged in the same direction form the same cluster, and outputs information on the point for each cluster.

The adjacent cluster reduction unit 114 receives the information on the point for each cluster as an input, calculates the principal component direction of the point in the cluster, and searches for a cluster having an adjacency relationship with the cluster of interest. The adjacent cluster reduction unit 114 uses the cluster reduction method to compare the distribution of points in the clusters with respect to clusters having an adjacency relationship, and excludes clusters in which points are not linearly elongated from the road boundary candidates, thereby reducing the clusters.

The line fitting unit 116 receives, as inputs, the information on the road boundary candidate point and the information on the position trajectory of the measuring instrument, determines whether to perform straight line fitting or curved line fitting on the nearby road boundary candidate point according to the shape of the position trajectory, and outputs the fitted line. The line fitting unit 116 performs fitting with one or more lines such that an error in the position of the straight line portion and the curved line portion with respect to the road boundary candidate point is reduced, and outputs the result as a line of the road boundary candidate.

The line connecting unit 118 connects lines having high continuity to the fitted lines as the road boundary candidates by using a predetermined analysis method. As an analysis method, a method of analyzing continuity between lines existing in the vicinity using information such as a distance between end points, a difference in a direction of a line at the end points, intersection of lines, a length of a perpendicular line drawn from an end point of one line to another line, and a length of a line is used. Note that the line connecting unit 118 may analyze the length of the connected line and exclude a line having a length equal to or less than a certain length from the road boundary candidates. The line connecting unit 118 may analyze the continuity by combining the plurality of conditions. As described above, the line connecting unit 118 connects some of the fitted line based on the analysis result of the continuity.

The information output unit 120 outputs a calculated line as the road boundary information. The calculated line is a line fitted by the processing of the line fitting unit 116 or a line obtained by connecting lines fitted by the processing of the line connecting unit 118.

Next, an operation of the road boundary detection device 100 will be described. FIG. 4 is a flowchart illustrating a flow of road boundary detection processing by the road boundary detection device 100. The CPU 11 reads the road boundary detection program from the ROM 12 or the storage 14, loads the road boundary detection program in the RAM 13, and executes the road boundary detection program, thereby performing road boundary detection processing.

In step S100, the CPU 11 receives point cloud data as an input. The point cloud data includes three-dimensional point cloud information and information on the position trajectory of the measuring instrument that has measured the point cloud.

The processing of steps S102 and S104 is executed by the CPU 11 as processing of the point cloud density reduction unit 108.

In step S102, the CPU 11 down-samples the points of the point cloud data to reduce the point density.

In down-sampling, for example, each axis of a three-dimensional space is divided at regular intervals to form voxels, the position of the center of gravity of a point in the voxel is used as a representative point of the voxel, and the point density can be reduced by deleting other points.

Next, the processing of step S104 is executed by the CPU 11 as processing of the point cloud density reduction unit 108 in LoopA1. In LoopA1, loop processing is executed for each point of the point cloud data after the point density is deleted.

In step S104, in a case where the peripheral point density is equal to or less than the threshold value, the CPU 11 deletes the point of interest and then excludes the point from the processing targets of subsequent steps. For each point after the reduction, a point within a certain distance of the point of interest may be counted as a peripheral point, and in a case where the distance is equal to or less than a threshold value, it may be determined that the point has a large measurement error and the point of interest may be deleted. In addition, in a case where the relative altitude of a point is equal to or higher than a threshold value in comparison with the position information of the nearby measuring instrument, it may be determined that the point is not the road boundary and the point of interest may be deleted. In addition, in a case where the distance to the position information of the nearby measuring instrument is equal to or greater than the threshold value, it may be determined that the point is not the road boundary and the point of interest may be deleted, or the point on the left or right side as compared with the traveling direction of the nearby measuring instrument may be excluded from the target of the road boundary detection and the point of interest may be deleted.

The processing of step S106 is executed by the CPU 11 as processing of the candidate point detection unit 110.

In step S106, the CPU 11 detects the road boundary candidate point from the reduced point cloud data. Details of the detection processing will be described later as a subroutine.

Next, step S108 is executed by the CPU 11 as processing of the candidate point clustering unit 112 in LoopB1 and LoopB2. For each point of the point cloud data in LoopB1, loop processing is performed for a peripheral point of the point of interest in LoopB2.

In step S108, the CPU 11 receives, as an input, a point cloud that is a road boundary candidate, and calculates a weight value based on a principal component vector of an angle formed by line segments connecting points such that points arranged in the same direction are in the same cluster (a set of points arranged in parallel is in a different cluster) for the peripheral point of the point of interest.

In step S109, the CPU 11 clusters each point of the road boundary candidates based on the calculated weight value, and outputs information on the point for each cluster.

Figure 5A:
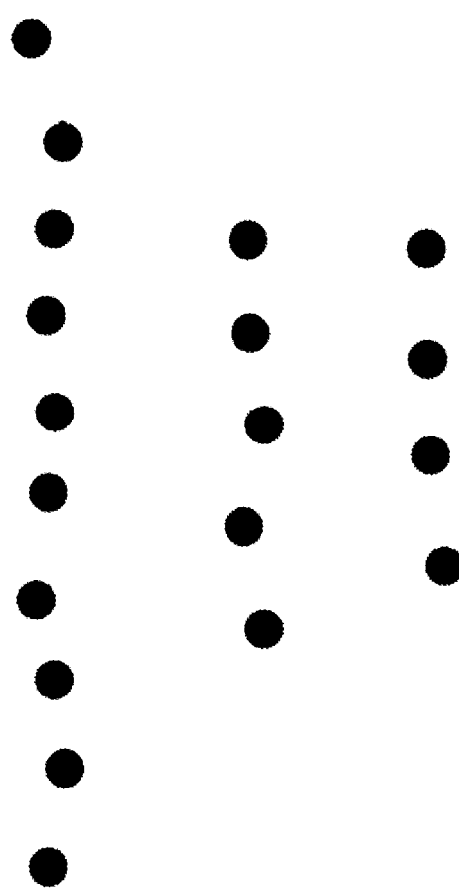
FIG. 5A is an example related to clustering processing.
Figure 5B:
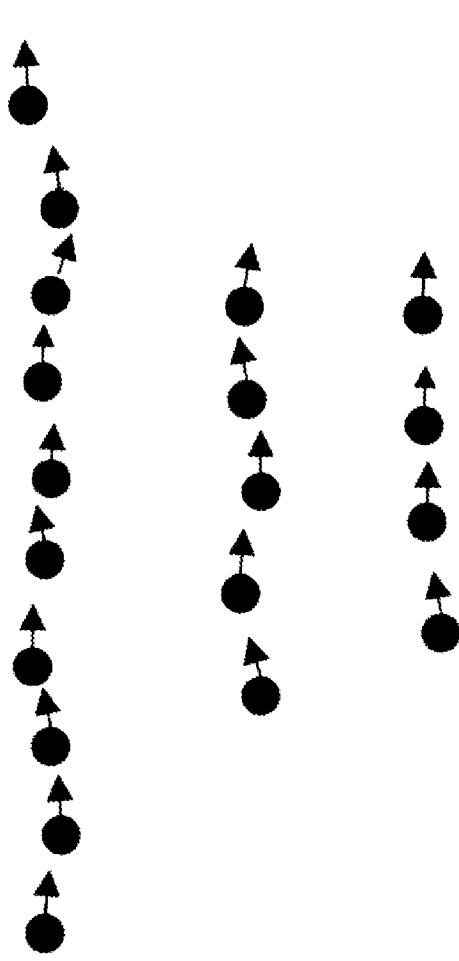
FIG. 5B is an example related to clustering processing.
Figure 5D:
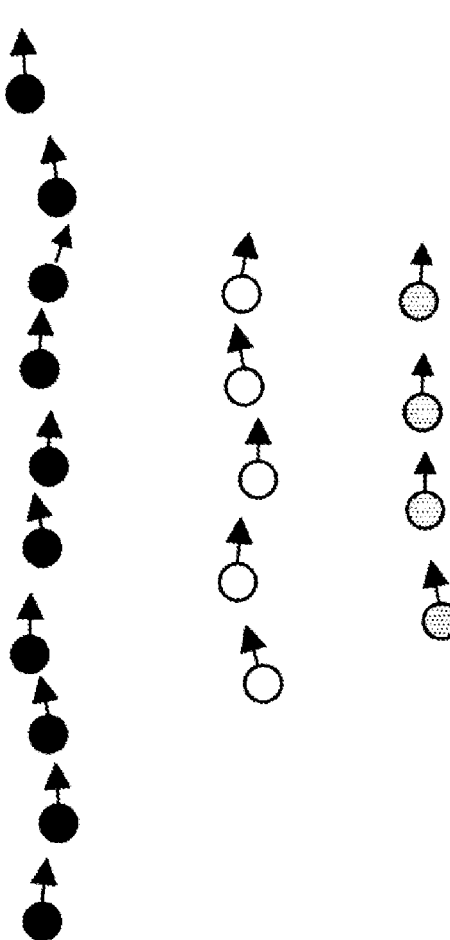
FIG. 5D is an example related to clustering processing.

FIGS. 5A to 5D illustrate examples of the clustering processing of steps S108 and S109. FIG. 5A illustrates a point cloud that is an input road boundary candidate. In the processing, first, for each candidate point, n neighboring points (peripheral points) are extracted and subjected to principal component analysis, and the first principal component is set as a principal component vector of the point. FIG. 5B is a principal component vector calculated from neighboring points of each point. Subsequently, in the processing, a graph connecting neighboring points among all candidate points is constructed. FIG. 5C illustrates weights of edges at the time of clustering of the constructed graph. The weight of the edges of the graph is defined to be larger as the principal component vector is directed in the same direction and is continuous in the direction of the principal component vector. For example, as illustrated in FIG. 5, weight value $w_{A,B}$ of the following Equation (1) can be used as weights of points A and B. FIG. 5D illustrates a clustering result, and illustrates that the same direction is the same cluster and sets of points arranged in parallel are different clusters.

[Math. 1]

$$w_{A,B} = \frac{\theta_A + \theta_B}{2} \tag{1}$$

Here, $\theta_A$ is a value representing an angle formed by the principal component vector of the point A and a line segment connecting the point A and the point B between 0 degrees and 90 degrees. OB is a value similarly represented for the point B. The candidate points are clustered by applying graph clustering to the graph. Any method can be used for graph clustering, and for example, the graph clustering method disclosed in Non Patent Literature 2 can be used.

Non Patent Literature 2: FELZENSZWALB, Pedro F.; HUTTENLOCHER, Daniel P. Efficient graph-based image segmentation. International journal of computer vision, 2004, 59.2:167-181.

Next, the processing of steps S110 to S116 is executed by the CPU 11 as processing of the adjacent cluster reduction unit 114. In LoopC1 and LoopC2, the processing of steps S110 and S112 is performed. Loop processing is performed for each cluster in LoopC1 and for the peripheral clusters of the cluster of interest in LoopC2. The processing of steps S110 to S116 is an example of a predetermined cluster reduction method of the present disclosure.

In step S110, the CPU 11 receives the information on the points of the cluster as an input, calculates the principal component direction (principal component vector) of the points in the cluster, and searches for a cluster having an adjacency relationship with the cluster of interest.

In step S112, the CPU 11 determines whether or not the peripheral cluster searched for the cluster of interest has an adjacency relationship with the cluster of interest. In a case where it is determined that there is an adjacency relationship, the process proceeds to step S114, and in a case where it is determined that there is no adjacency relationship, the process proceeds to step S116.

In step S114, the CPU 11 updates the score of the cluster for the peripheral cluster determined to be in the adjacency relationship.

Figure 6A:
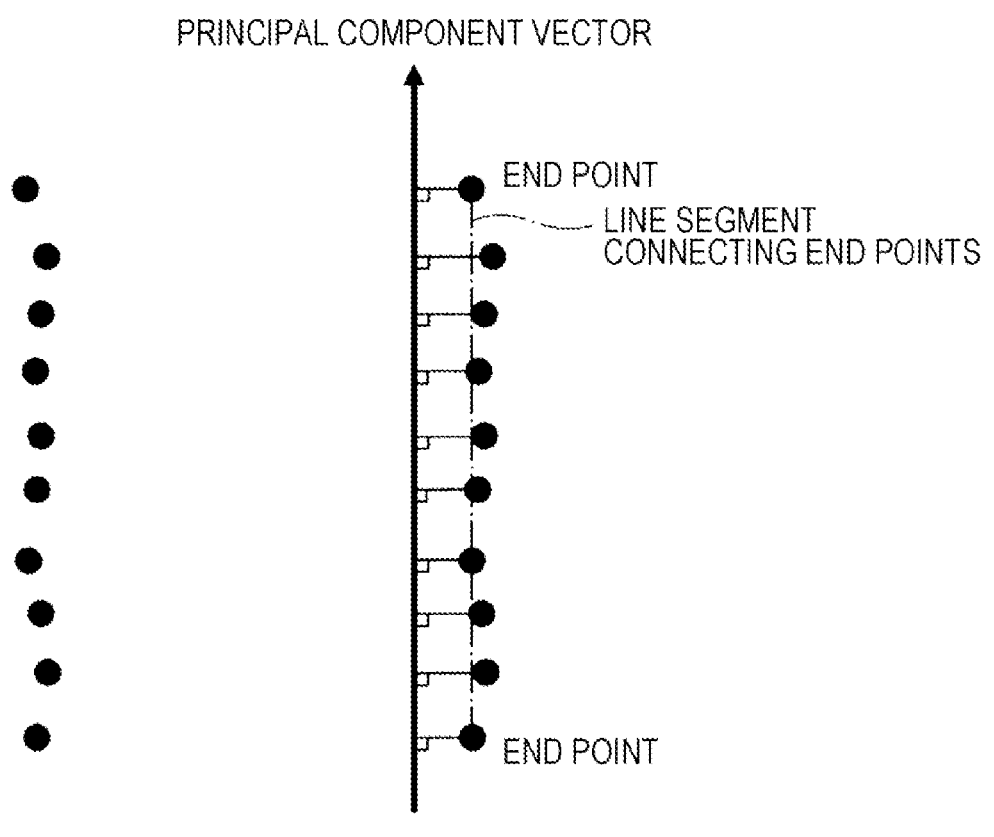
FIG. 6A is an example related to adjacent cluster reduction processing.
Figure 6B:
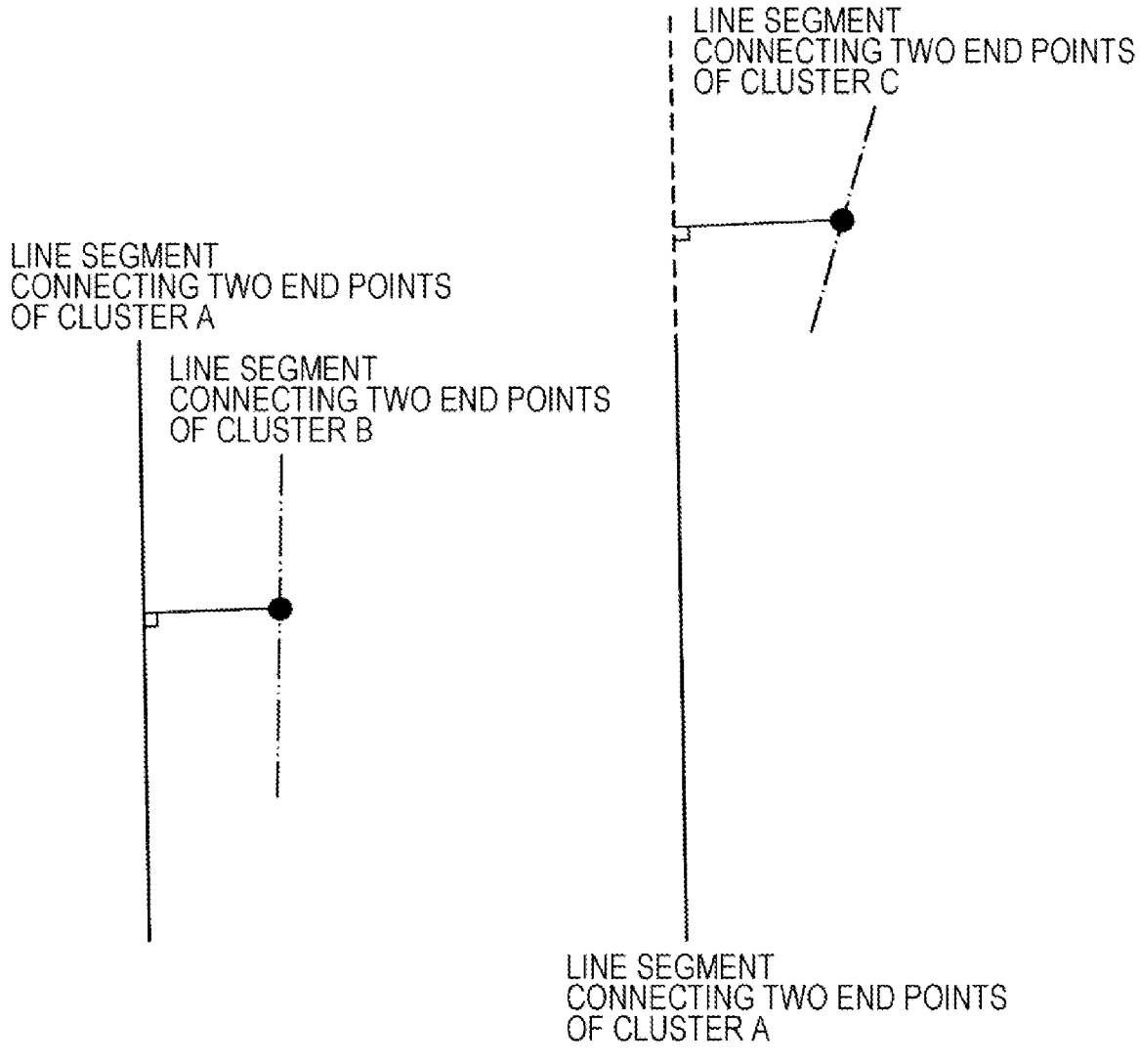
FIG. 6B is an example related to adjacent cluster reduction processing.
Figure 6C:
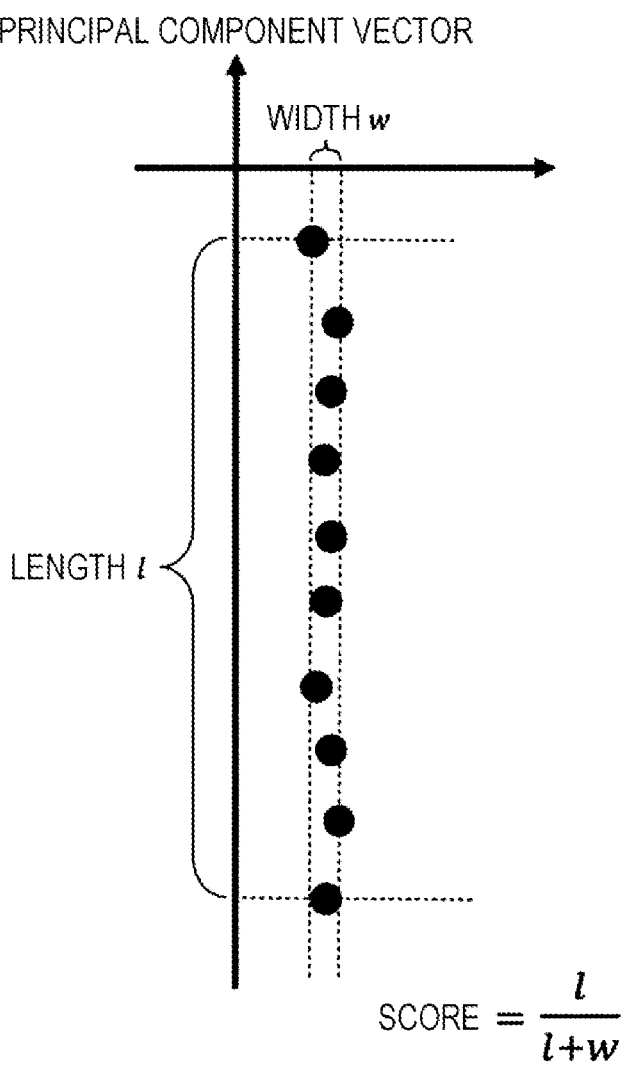
FIG. 6C is an example related to adjacent cluster reduction processing.
Figure 7A:
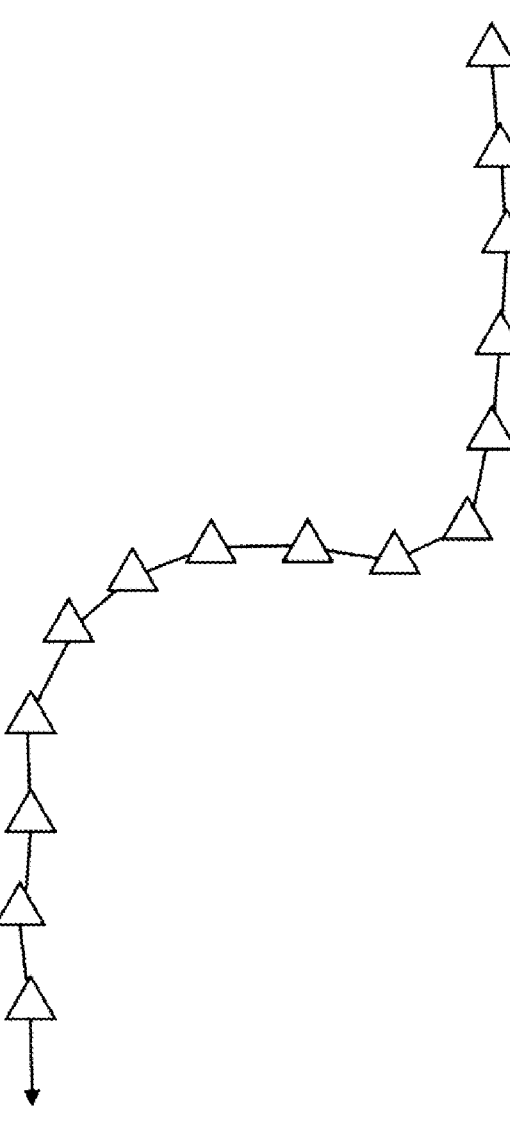
FIG. 7A is an example related to classification processing.
Figure 7B:
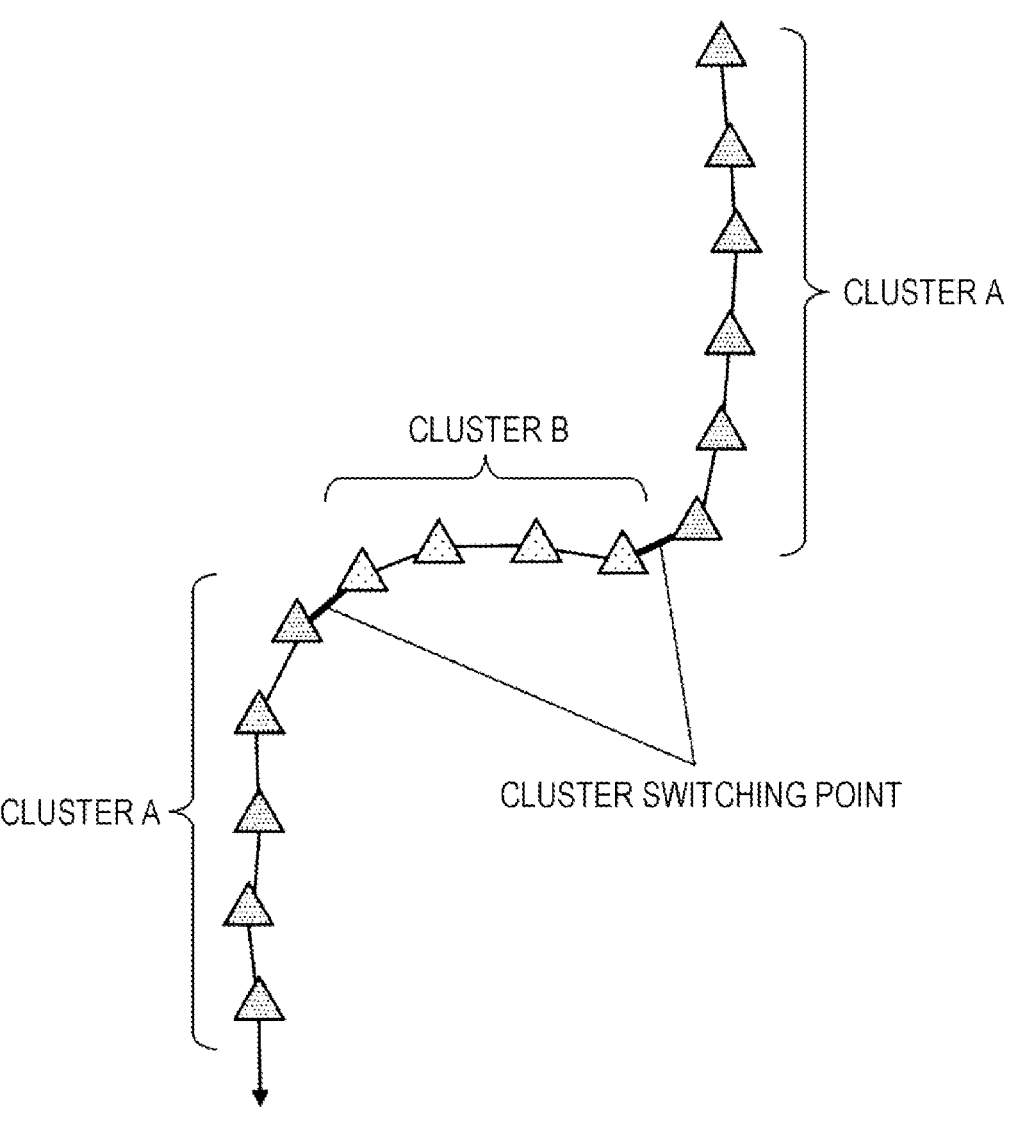
FIG. 7B is an example related to classification processing.
Figure 7C:
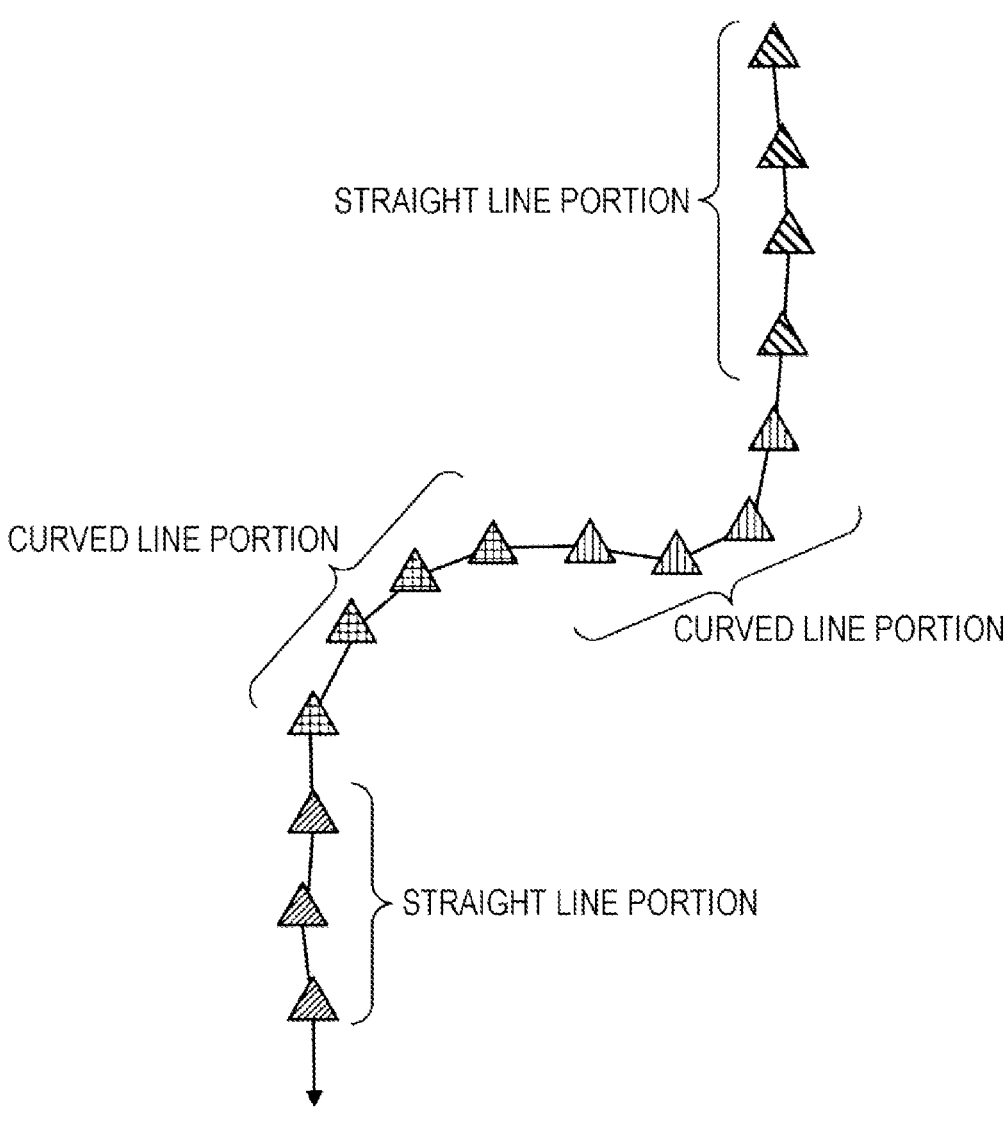
FIG. 7C is an example related to classification processing.
Figure 7D:
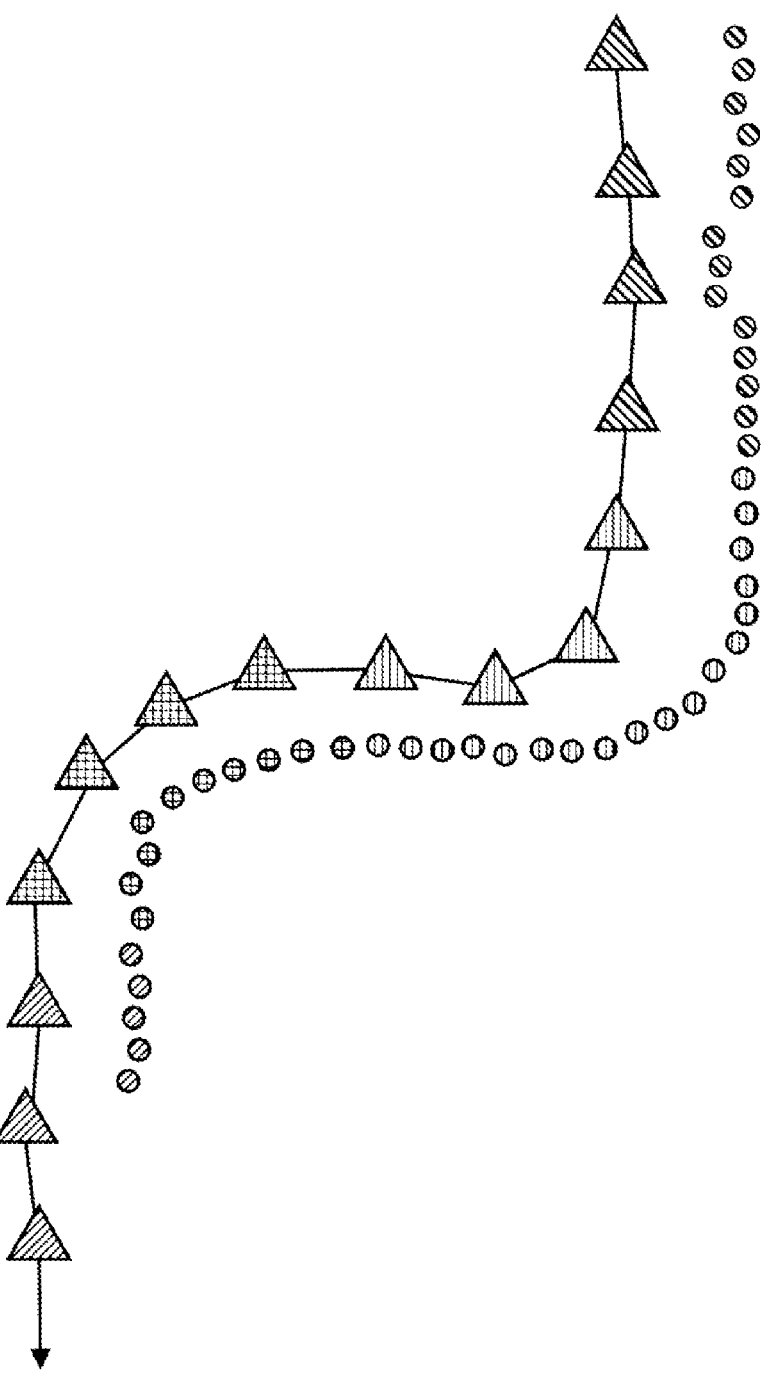
FIG. 7D is an example related to classification processing.

FIGS. 6A to 6C illustrate examples of the adjacent cluster reduction processing of steps S110 to S114. FIG. 6A illustrates an example in which each cluster created by the candidate point clustering unit 112 and a line segment are determined by connecting end points of the clusters. In the processing, the principal component vector of the cluster of interest is calculated from a set of points included in the cluster, and points existing at both ends in the direction of the principal component vector of the cluster of interest are defined as end points and are defined as line segments corresponding to the cluster. Next, in the processing, it is determined whether the clusters existing around the cluster are adjacent. FIG. 6B illustrates an adjacent example and a non-adjacent example. In a case where a foot of a perpendicular line drawn from a midpoint of a line segment of a peripheral cluster to a straight line connecting two end points of the cluster of interest is included between the two end points, it is determined that both clusters are adjacent. Each cluster has a score representing the elongated length of the point to which it belongs, and for example, the score of a cluster A can be calculated by SA of the following Equation (2).

[Math. 2]

$$S_A = \frac{l_A}{l_A + w_A} \tag{2}$$

Here, la represents a difference (length l) between a maximum value and a minimum value when a point belonging to the cluster A is projected onto an axis parallel to the principal component vector, and $w_A$ represents a difference (width w) between a maximum value and a minimum value when a point belonging to the cluster A is projected onto an axis orthogonal to the principal component vector. FIG. 6C illustrates a relationship between the length l and the width w in score calculation.

In step S116, score values of adjacent clusters are compared, and a point belonging to a cluster having a smaller score value is deleted from the road boundary candidates. That is, the cluster is deleted. For example, for adjacent clusters A and B, the values of SA and SB are compared, and a point belonging to a cluster having a smaller value is deleted from the road boundary candidates. Note that, in a case where there are a plurality of adjacent clusters for a certain cluster, it may be determined to delete the cluster when the score is smaller than that of the majority of adjacent clusters. As described above, the distribution of points in the cluster is compared.

Next, the processing of steps S118 to S122 is executed by the CPU 11 as processing of the line fitting unit 116. The processing of step S120 is performed in LoopD1 and LoopD2, and the processing of step S122 is performed in LoopE1. Loop processing is performed for each straight line portion in LoopD1 and for each cluster corresponding to the portion of interest in LoopD2. Loop processing is performed for each curved line portion in LoopE1. The processing of steps S118 to S122 is an example of a predetermined analysis method of the present disclosure.

In step S118, the CPU 11 classifies the information on the position trajectory of the measuring instrument into a straight line portion and a curved line portion as the type of line to be fitted to the subset of the road boundary candidate points.

FIG. 7 illustrates an example of the classification processing of step S118. FIG. 7A is an example of a position trajectory of the measuring instrument. In the position trajectory, the position of the measuring device at regular time intervals is defined as a measurement point, and the direction connecting the position of the measurement point at a certain time and the position of the measurement point at the next time is defined as the traveling direction of the measurement point. The measurement points are clustered on the basis of the traveling direction, the measurement points before and after the cluster switching point when measurement points are viewed in time-series order are defined as curved line portions, and the other portions are defined as straight line portions. FIG. 7B illustrates clustering of position trajectories depending on the traveling direction. Note that each cluster of measurement points is defined as a curved line portion or a straight line portion different from each other. FIG. 7C illustrates classification of a straight line portion and a curved line portion. Then, for each point of the road boundary candidate points, the type of line to be fitted is determined according to whether the nearest measurement point is a straight line portion or a curved line portion. FIG. 7D illustrates whether the road boundary candidate point is classified into a straight line portion or a curved line portion.

In step S120, the CPU 11 fits a straight line to a point in the cluster of interest for each cluster corresponding to each straight line portion.

In step S122, the CPU 11 fits a curved line to points of the entire cluster for the cluster corresponding to each curved line portion.

Figure 8A:
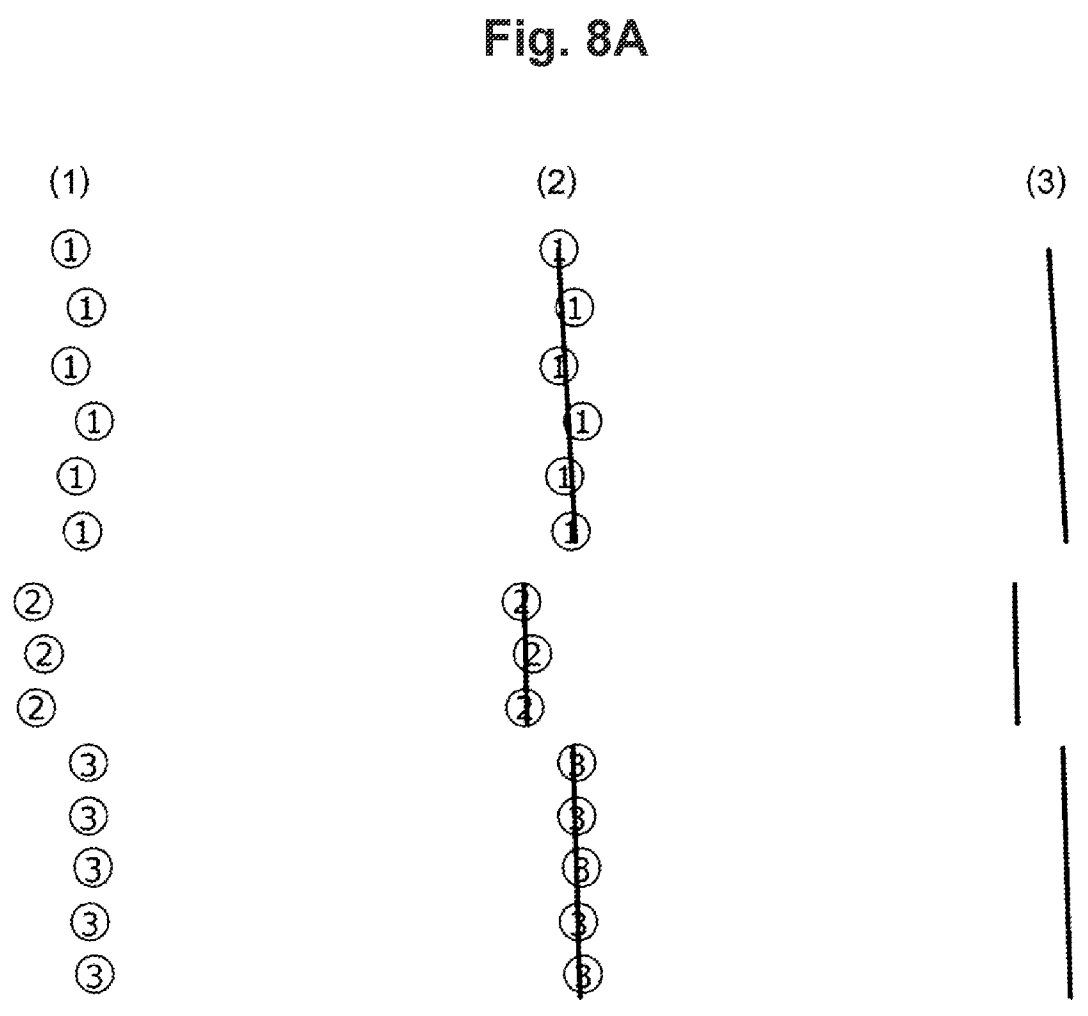

FIG. 8 illustrates an example of a process of fitting a line. FIG. 8A illustrates the fitting of a line to a straight line portion. The straight line portion is fitted to the cluster of candidate points given by the candidate point clustering unit with one line segment. (1) illustrates road boundary candidate points belong to a cluster of the same position trajectory. (2) illustrates straight line fit in units of candidate point clusters. (3) illustrates line fitting results. In a case where the points in the cluster of candidate points are divided into two or more straight line portions or curved line portions and associated, fitting is performed as separate lines. The line segment to be fitted may be determined by any method, for example, may be determined as a line segment connecting both end points in the direction of the principal component vector, or may be determined by Hough transform. In addition, for a straight line connecting between arbitrary candidate points, a value corresponding to a distance between each point and the straight line may be integrated to calculate an error in fitting, and the line segment may be determined in a case where the error is minimized.

Figure 8B:
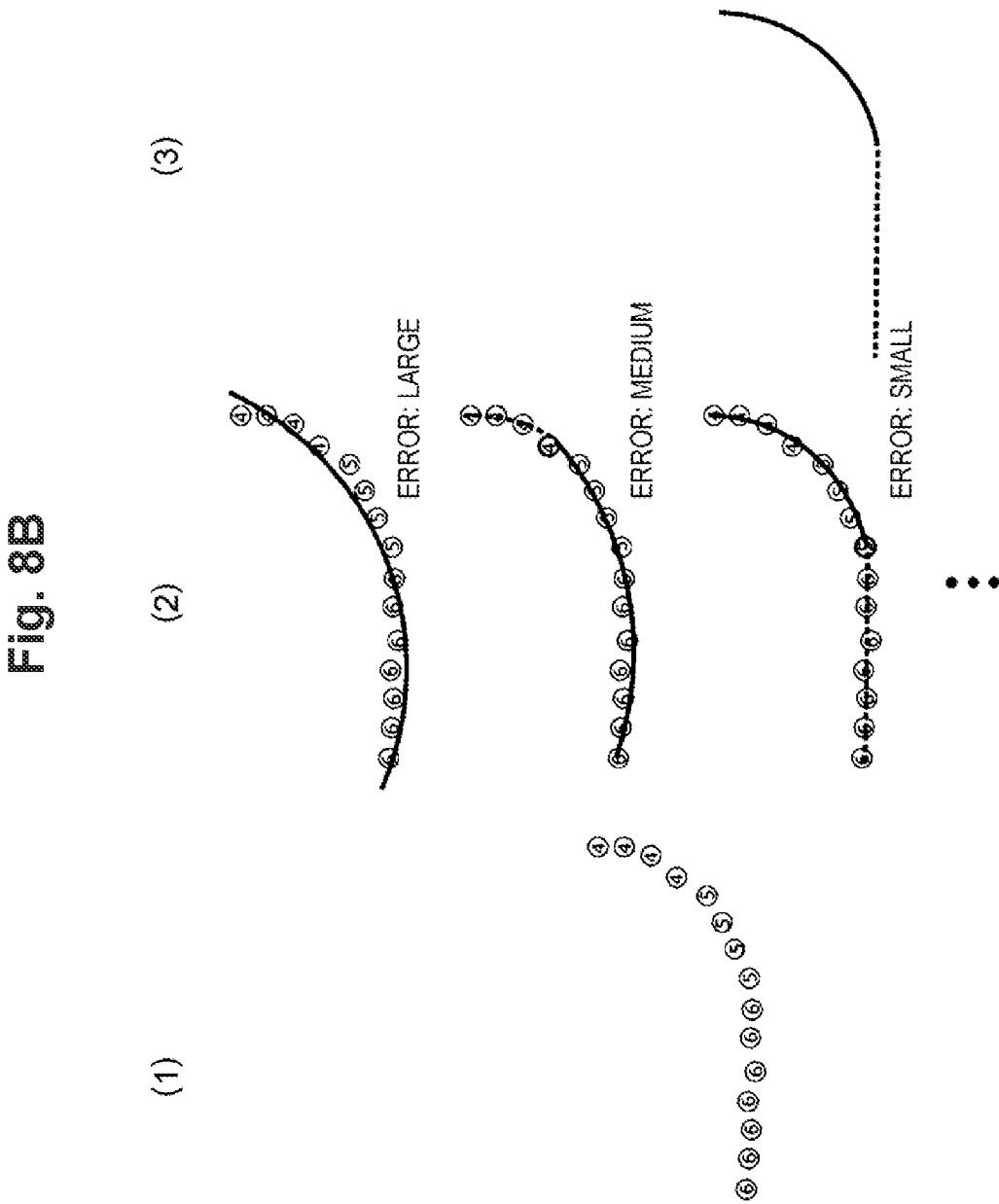
FIG. 8B is an example of fitting a line to a curved line portion.

FIG. 8B illustrates the fitting of a line to a curved line portion. The points corresponding to the curved line portion are fitted as a single arc regardless of the cluster of candidate points. (1) illustrates road boundary candidate points belong to a cluster of the same position trajectory. (2) illustrates curved line and straight line fit to the entire candidate point cluster. In the second and third lines from the top, two lines are fitted with a thick frame point as a boundary. (3) illustrates line fitting results. One or more of the candidate points may be set as division points, and fitting may be performed as a combination of a plurality of line segments and arcs with the division points as boundaries. The arc to be fitted to the curved line portion may be determined by any method, and for example, among circles having any radius passing through both end points of the constituent point of the curved line portion, a circle having a minimum error between the arc and the constituent point may be determined as an arc divided by a central angle corresponding to both end points. Furthermore, smooth connection at the division point may be used as a constraint.

The processing of steps S124 and S126 is executed by the CPU 11 as processing of the line connecting unit 118. In LoopF1 and LoopF2, the processing of step S124 is performed. In LoopG1, the processing of step S126 is performed. Loop processing is performed for each line in LoopF1 and for the peripheral lines of the line of interest in LoopF2. Loop processing is performed for each line in LoopG1.

In step S124, the CPU 11 connects lines of the road boundary candidates having high continuity. The continuity is defined by a distance between end points, a difference in a direction of a line at the end points, intersection of lines, a length of a perpendicular line drawn from an end point of one line to another line, a length of a line, and the like. In the determination of the continuity of the fitted line, any one of these conditions or a combination of a plurality of these conditions is determined to determine whether the line is a line to be connected or a line not to be connected.

In step S126, the CPU 11 excludes lines (short lines) having a predetermined length or less from the road boundary candidates for each connected line.

Figure 9B:
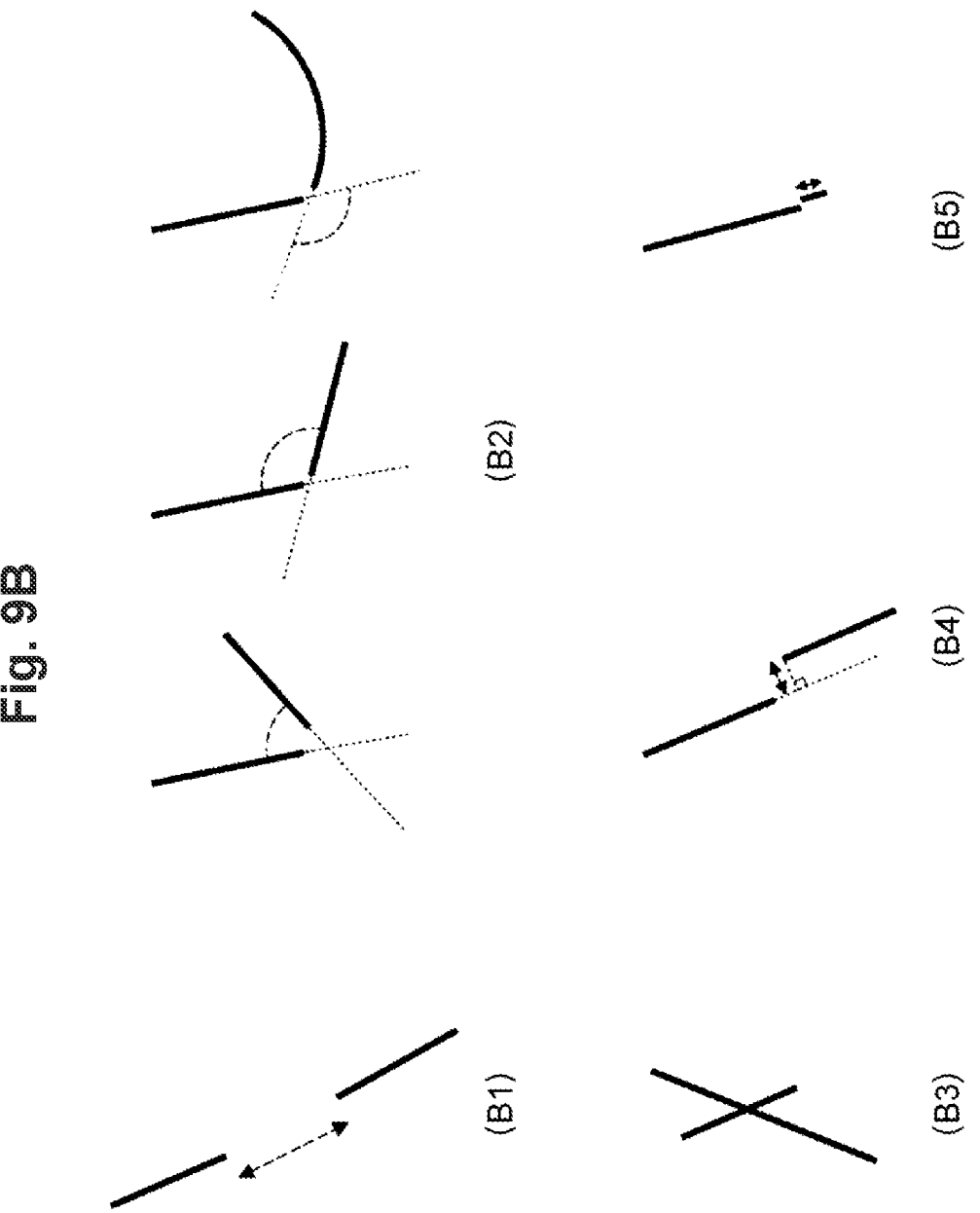
FIG. 9B is an example of lines that are not to be connected.

FIG. 9 illustrates an example of lines to be connected and an example of lines not to be connected. FIG. 9A illustrates an example of lines to be connected, and FIG. 9B illustrates an example of lines (B1) to (B5) not to be connected. In the example illustrated in FIG. 9A, examples of lines before and after connection with high continuity are illustrated. The example of FIG. 9B is (B1) a case where the distance between end points is long, and (B2) a case where the direction difference between lines at both end points deviates from 180°. Also, the example of FIG. 9B is (B3) a case where lines intersect (including solid intersection), (B4) a case where the distance from the end point of a line to a foot of a perpendicular line drawn on another line is long, and (B5) a case where the length of a line is short.

In step S128, the CPU 11 outputs the calculated line as the road boundary information by the processing of steps S100 to S126.

Figure 10:
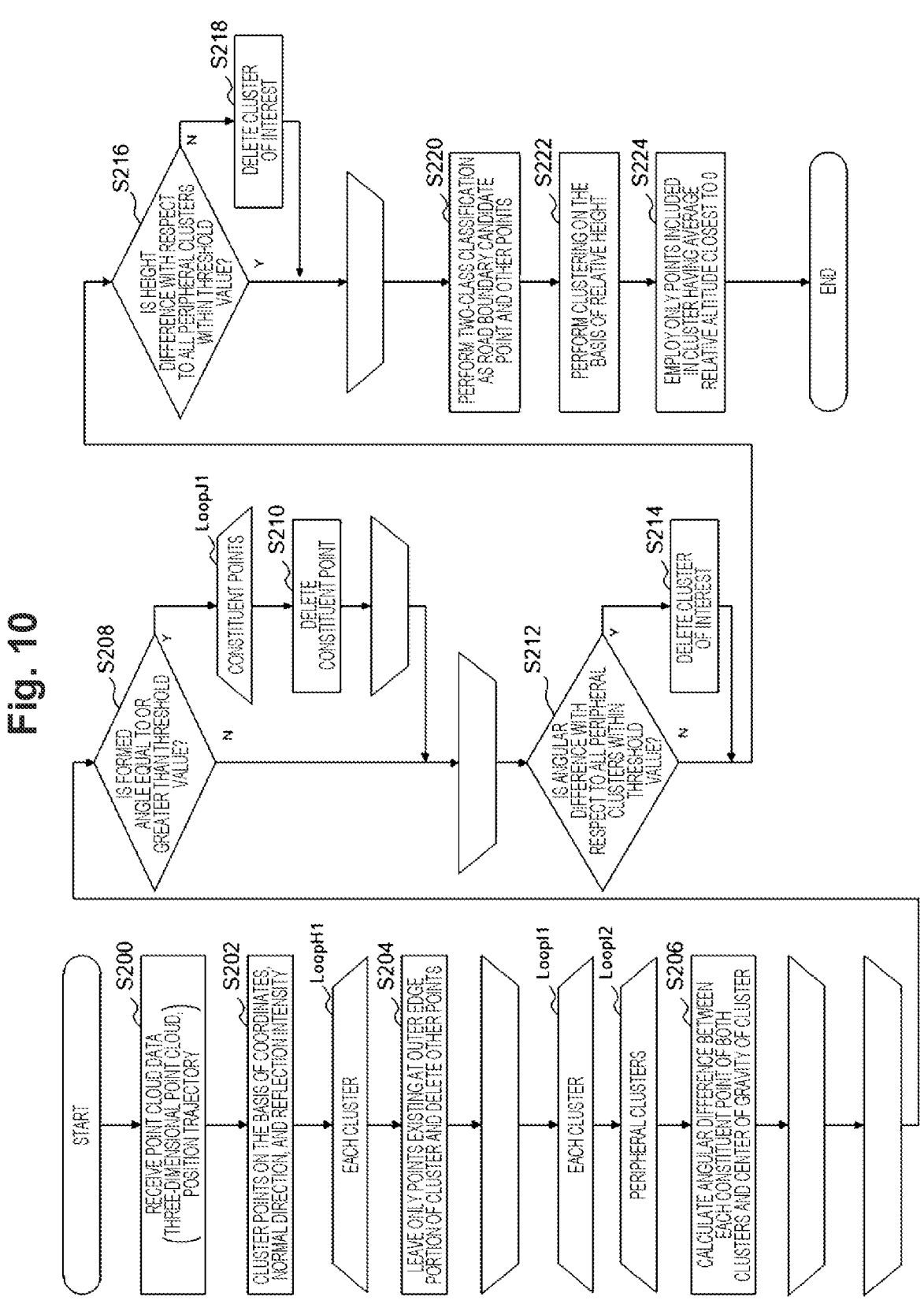
FIG. 10 is a subroutine of detection processing of a road boundary candidate point.
Figure 11A:
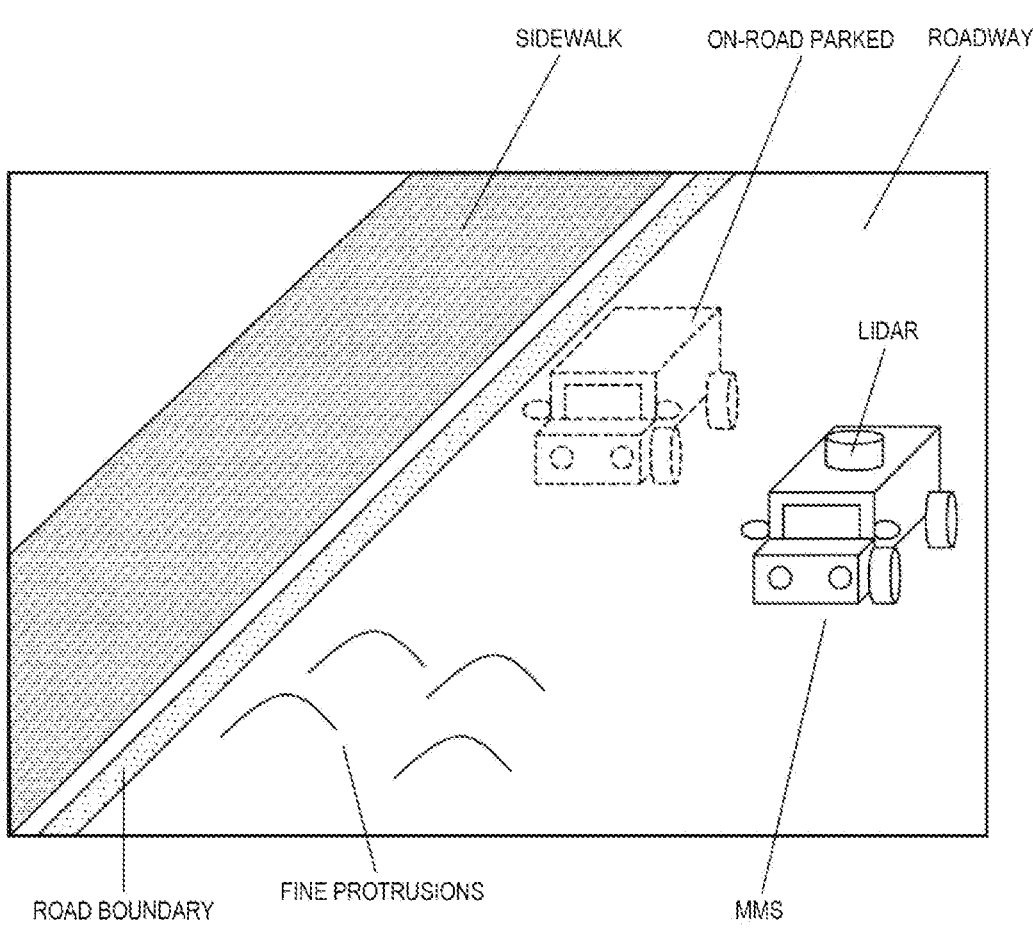
FIG. 11A is an image of road boundary detection.

Next, a subroutine of detection processing of the road boundary candidate point in step S106 will be described with reference to FIG. 10.

In step S200, the CPU 11 receives the reduced point cloud data as an input.

In step S202, the CPU 11 clusters the points on the basis of the coordinates of the points in the point cloud data, the normal direction calculated from the peripheral points of the points of interest, and the reflection intensity of the laser emitted from the measuring instrument. Thus, points that are close to each other, constitute the same local plane, and have the same color and material form a cluster.

Loop processing (S204) is performed for each cluster in LoopH1.

In step S204, for each calculated cluster, the CPU 11 leaves only points existing at the outer edge portion of the cluster and deletes other points from the cluster. For example, an alpha shape calculation algorithm disclosed in Non Patent Literature 3 can be used to detect the points on the outer edge portion of the cluster.

Non Patent Literature 3: EDELSBRUNNER, Herbert; KIRKPATRICK, David; SEIDEL, Raimund. On the shape of a set of points in the plane. IEEE Transactions on information theory, 1983, 29.4: 551-559.

It is assumed that the road boundary is constituted by a vertical plane, while the roadway and the sidewalk existing on both sides of the road boundary are constituted by horizontal planes. Therefore, based on the normal direction of each cluster, points other than clusters located at the boundary between two planes having different angles are deleted. Specifically, the angular difference is calculated by comparing the normal direction calculated from the point included in each cluster with the normal direction of the neighboring adjacent cluster, and in a case where the angular difference with the normals of all the peripheral clusters is within a threshold value, it is determined that the cluster is not located at the boundary of two planes, and the cluster of interest is deleted.

In addition, even in a case where there is a peripheral cluster in which the angular difference is equal to or greater than the threshold value, many of the points at the outer edge portion of the cluster are not located at the boundary of two planes but belong to only one plane. Therefore, a threshold value between the line segments of the cluster is determined on the basis of the angular difference between the normals.

Loop processing (S206 to S218) is performed for each cluster in LoopI1. Loop processing (S206 to S210) is performed for the peripheral clusters in LoopI2. Loop processing (S210) is performed for the constituent points of the cluster of interest in LoopJ1 nested in LoopI2.

In step S206, the CPU 11 calculates an angular difference between each constituent point of both the cluster of interest and the peripheral cluster and the center of gravity of the cluster.

In step S208, for each constituent point of the cluster of interest, the CPU 11 determines whether or not an angle formed by a line segment connecting the center of gravity of the cluster of interest and the center of gravity of a peripheral cluster having an angular difference equal to or greater than a threshold value and a line segment connecting the center of gravity of the cluster of interest and the constituent point is equal to or greater than the threshold value. In a case where it is determined that the angle is equal to or greater than the threshold value, the process proceeds to step S210, and in a case where it is determined that the angle is not equal to or greater than the threshold value, the process proceeds to step S212.

In step S210, the CPU 11 determines that the point belongs to only one plane and deletes the constituent point of interest as a case where the angle is equal to or greater than the threshold value.

In step S212, the CPU 11 determines whether or not the angular difference between the cluster of interest and all the peripheral clusters is within a threshold value. In a case where it is determined that the angular difference is within the threshold value, the process proceeds to step S214, and in a case where it is determined that the angular difference is not within the threshold value, the process proceeds to step S216.

In step S214, the CPU 11 determines that the angular difference with respect to all the peripheral clusters is within the threshold value, and deletes the cluster of interest.

In step S216, the CPU 11 determines whether or not the height difference between the cluster of interest and all the peripheral clusters is within a threshold value. In a case where it is determined that the height difference is not within the threshold value, the process proceeds to step S218, and in a case where it is determined that the height difference is within the threshold value, the process proceeds to step S220.

In step S218, the CPU 11 determines that the height difference with respect to the cluster of interest is not within the threshold value, and deletes the cluster of interest. In other words, in a case where there is a peripheral cluster whose height difference with respect to the cluster of interest is equal to or greater than the threshold value, it is determined that the region is not a road boundary and has a step, and the cluster of interest is deleted.

In step S220, the CPU 11 performs two-class classification as the road boundary candidate point and the other points such that the points arranged parallel to the position trajectory of the measuring instrument are classified as the same class. In a case where a point cloud is measured by traveling on a roadway using a LiDAR mounted on an MMS or the like as a measuring instrument, it is assumed that the road boundary exists substantially along a position trajectory of the measuring instrument. Examples of the object existing in parallel with the position trajectory of the measuring instrument include objects other than the road boundary, such as buildings and structures on the sidewalk.

Therefore, in step S222, the CPU 11 clusters all the points included in the class of the road boundary candidate point on the basis of the relative height from the nearby measurement position trajectory point.

In step S224, the CPU 11 employs only the points included in the cluster having the average relative altitude closest to 0, and deletes the points included in the other clusters. This makes it possible to exclude points other than objects existing at the same height as the roadway.

As described above, according to the road boundary detection device 100 of the present embodiment, processing using point cloud data is performed to remove a line erroneously detected in a case where there is a shielding object such as an on-road parked vehicle on a roadway and to analyze a height difference robustly even in a case where there is fine undulation on the roadway. Thus, the line corresponding to the road boundary can be acquired with high accuracy.

According to the technique of the present disclosure, among the points detected as the road boundary candidates, the points arranged in the same direction are grouped into clusters, and the other clusters are reduced while the main cluster is left for the adjacent clusters, whereby the road boundary candidate points erroneously detected due to the on-road parked vehicle or the undulations of the road are excluded, and the line corresponding to the road boundary can be fitted with high accuracy.

Furthermore, according to the technique of the present disclosure, fine undulations are leveled by down-sampling the point cloud before processing, whereby erroneous detection of a road boundary candidate point caused by the undulations can be avoided, and the number of processing points can be further reduced and detection can be performed at high speed.

In addition, according to the technique of the present disclosure, after fitting lines to road boundary candidate points, the lines are connected according to determination of continuity, and a short line among the connected lines is excluded from the road boundary candidates, whereby erroneous detection of road boundary candidates that are blind spots for on-road parked vehicles and could not be reduced by the adjacent cluster reduction unit because the road boundary portion was not detected can also be reduced, and the road boundary can be detected with high accuracy.

Note that the road boundary detection processing executed in a case where the CPU reads software (program) in the embodiment may be executed by various processors other than the CPU. Examples of the processors in this case include a programmable logic device (PLD) whose circuit configuration can be changed after the manufacturing, such as a field-programmable gate array (FPGA), and a dedicated electric circuit that is a processor having a circuit configuration exclusively designed for executing specific processing, such as a graphics processing unit (GPU) and an application specific integrated circuit (ASIC). In addition, the road boundary detection processing may be performed by one of these various processors, or may be performed by a combination of two or more processors of the same type or different types (for example, a plurality of FPGAs, a combination of a CPU and an FPGA, and the like). More specifically, a hardware structure of the various processors is an electric circuit in which circuit elements such as semiconductor elements are combined.

Further, in the embodiment, the aspect in which the road boundary detection program is stored (installed) in advance in the storage 14 has been described, but the present disclosure is not limited thereto. The program may be provided by being stored in a non-transitory storage medium such as a compact disk read only memory (CD-ROM), a digital versatile disk read only memory (DVD-ROM), and a Universal Serial Bus (USB) memory. In addition, the program may be downloaded from an external device via a network.

Regarding the above embodiments, the following supplementary notes are further disclosed.

(Supplementary Note 1)

A road boundary detection device including:

a memory; and at least one processor connected to the memory, in which the processor is configured to:

detect each point of road boundary candidates corresponding to candidates of a road boundary from point cloud data;

cluster each point of the road boundary candidates;

reduce a cluster from a distribution of points in clusters in an adjacency relationship by using a predetermined cluster reduction method;

fit one or more straight lines or curved lines to one or more of the clusters and output fitted lines;

connect some of the fitted lines; and output a calculated line as the road boundary information.

(Supplementary Note 2)

A non-transitory storage medium storing a program executable by a computer to execute road boundary detection processing including:

detecting each point of road boundary candidates corresponding to candidates of a road boundary from point cloud data;

clustering each point of the road boundary candidates;

reducing a cluster from a distribution of points in clusters in an adjacency relationship by using a predetermined cluster reduction method;

fitting one or more straight lines or curved lines to one or more of the clusters and outputting fitted lines;

connecting some of the fitted lines; and outputting a calculated line as the road boundary information.

REFERENCE SIGNS LIST

100 Road boundary detection device
108 Point cloud density reduction unit
110 Candidate point detection unit
112 Candidate point clustering unit
114 Adjacent cluster reduction unit
116 Line fitting unit
118 Line connecting unit
120 Information output unit

The invention claimed is:

1. A road boundary detection device that acquires a set of lines corresponding to a road boundary from point cloud data as road boundary information, the road boundary detection device comprising:

a candidate point detection unit configured to detect each point of road boundary candidates corresponding to candidates of a road boundary from the point cloud data;

a candidate point clustering unit configured to cluster each point of the road boundary candidates;

an adjacent cluster reduction unit configured to reduce a cluster from a distribution of points in clusters in an adjacency relationship by using a predetermined cluster reduction method;

a line fitting unit configured to fit one or more straight lines or curved lines to one or more of the clusters and output fitted lines as road boundary candidates, wherein the fitted lines for the one or more straight lines or the curved lines are determined by calculating a weight value based on a principal component vector formed by line segments connecting the points in clusters;

update a score of the one or more of the clusters based on the calculated weight;

a line connecting unit configured to connect some of the fitted lines by using a predetermined analysis method; and an information output unit configured to output a calculated line as the road boundary information.

2. A road boundary detection device that acquires a set of lines corresponding to a road boundary from point cloud data as road boundary information, the road boundary detection device comprising:

a point cloud density reduction unit configured to down-sample the point cloud data to reduce density;

a candidate point detection unit configured to detect each point of road boundary candidates corresponding to candidates of a road boundary from the reduced point cloud data;

a candidate point clustering unit configured to cluster each point of the road boundary candidates;

an adjacent cluster reduction unit configured to reduce a cluster from a distribution of points in clusters in an adjacency relationship by using a predetermined cluster reduction method;

a line fitting unit configured to fit one or more straight lines or curved lines to one or more of the clusters and output fitted lines as road boundary candidates, wherein the fitted lines for the one or more straight lines or the curved lines are determined by calculating a weight value based on a principal component vector formed by line segments connecting the points in clusters;

update a score of the one or more of the clusters based on the calculated weight;

a line connecting unit configured to connect some of the fitted lines by using a predetermined analysis method; and an information output unit configured to output a calculated line as the road boundary information.

3. The road boundary detection device according to claim 2, wherein the point cloud density reduction unit deletes a point of interest in a case where a peripheral point density of each point of the point cloud data after the down-sampling is equal to or less than a threshold value, and excludes the deleted point from processing targets.

4. The road boundary detection device according to claim 1, wherein the candidate point clustering unit clusters a set of points arranged in parallel as a different cluster by calculating a principal component vector of a point of interest from a positional relationship between each point of the road boundary candidates and a neighboring point and performing clustering on the basis of an angle formed by the principal component vector and a line segment connecting the point of interest and a peripheral point.

5. The road boundary detection device according to claim 1, wherein, in the cluster reduction method, the adjacent cluster reduction unit calculates a principal component vector of a cluster of interest from a set of points included in the cluster, determines two end points from a direction of the principal component vector of the cluster of interest, determines whether or not the clusters are adjacent clusters on the basis of whether or not a foot of a perpendicular line drawn from a midpoint of a peripheral cluster to a straight line connecting the two end points of the cluster of interest is included between the two end points, and determines a cluster to be reduced on the basis of a score calculated from a length and a width of the cluster between the adjacent clusters.

6. The road boundary detection device according to claim 1, wherein the line fitting unit clusters a position trajectory of a measuring device when the point cloud data is measured on the basis of a traveling direction, and determines whether to perform straight line fitting or curved line fitting on a subset of point clouds on the basis of a position of a cluster switching point.

7. The road boundary detection device according to claim 1, wherein, in the analysis method, the line connecting unit determines continuity of the fitted line and a line existing in a periphery of the fitted line on the basis of any one of a distance between end points, a difference in a direction of the line at the end points, intersection of the lines, a length of a perpendicular line drawn from an end point of one line to another line, and a length of the line, or a plurality of conditions, and determines whether or not to connect the fitted line and the line existing in the periphery of the fitted line.

8. The road boundary detection device according to claim 1, wherein the line connecting unit excludes a short line having a predetermined length or less among the connected lines from the road boundary candidates.

9. A road boundary detection method for acquiring, by a computer, a set of lines corresponding to a road boundary from point cloud data as road boundary information, the road boundary detection method causing the computer to execute processing of:

detecting each point of road boundary candidates corresponding to candidates of a road boundary from the point cloud data;

clustering each point of the road boundary candidates;

reducing a cluster from a distribution of points in clusters in an adjacency relationship by using a predetermined cluster reduction method;

fitting one or more straight lines or curved lines to one or more of the clusters and outputting fitted lines, wherein the fitted lines for the one or more straight lines or the curved lines are determined by calculating a weight value based on a principal component vector formed by line segments connecting the points in clusters;

updating a score of the one or more of the clusters based on the calculated weight;

connecting some of the fitted lines; and outputting a calculated line as the road boundary information.

10. A road boundary detection program for acquiring a set of lines corresponding to a road boundary from point cloud data as road boundary information, the road boundary detection program causing a computer to execute processing of:

detecting each point of road boundary candidates corresponding to candidates of a road boundary from the point cloud data;

clustering each point of the road boundary candidates;

reducing a cluster from a distribution of points in clusters in an adjacency relationship by using a predetermined cluster reduction method;

fitting one or more straight lines or curved lines to one or more of the clusters and outputting fitted lines, wherein the fitted lines for the one or more straight lines or the curved lines are determined by calculating a weight value based on a principal component vector formed by line segments connecting the points in clusters;

updating a score of the one or more of the clusters based on the calculated weight;

connecting some of the fitted lines; and outputting a calculated line as the road boundary information.

11. The road boundary detection method according to claim 9, wherein a point of interest is deleted in a case where a peripheral point density of each point of the point cloud data after the down-sampling is equal to or less than a threshold value, and excludes the deleted point from processing targets.

12. The road boundary detection method according to claim 9, wherein a set of points is clustered and arranged in parallel as a different cluster by calculating a principal component vector of a point of interest from a positional relationship between each point of the road boundary candidates and a neighboring point and performing clustering on the basis of an angle formed by the principal component vector and a line segment connecting the point of interest and a peripheral point.

13. The road boundary detection method according to claim 9, wherein, in the cluster reduction method, a principal component vector of a cluster of interest is calculated from a set of points included in the cluster, determines two end points from a direction of the principal component vector of the cluster of interest, determines whether or not the clusters are adjacent clusters on the basis of whether or not a foot of a perpendicular line drawn from a midpoint of a peripheral cluster to a straight line connecting the two end points of the cluster of interest is included between the two end points, and determines a cluster to be reduced on the basis of a score calculated from a length and a width of the cluster between the adjacent clusters.

14. The road boundary detection method according to claim 9, wherein a position trajectory is clustered when the point cloud data is measured on the basis of a traveling direction, and determines whether to perform straight line fitting or curved line fitting on a subset of point clouds on the basis of a position of a cluster switching point.

15. The road boundary detection method according to claim 9, wherein, in the analysis method, continuity of the fitted line and a line existing in a periphery of the fitted line are determined on the basis of any one of a distance between end points, a difference in a direction of the line at the end points, intersection of the lines, a length of a perpendicular line drawn from an end point of one line to another line, and a length of the line, or a plurality of conditions, and determines whether or not to connect the fitted line and the line existing in the periphery of the fitted line.

16. The road boundary detection device according to claim 9, wherein a short line having a predetermined length or less among the connected lines is excluded from the road boundary candidates.

17. The road boundary detection program according to claim 10, wherein a point of interest is deleted in a case where a peripheral point density of each point of the point cloud data after the down-sampling is equal to or less than a threshold value, and excludes the deleted point from processing targets.

18. The road boundary detection program according to claim 10, wherein a set of points is clustered and arranged in parallel as a different cluster by calculating a principal component vector of a point of interest from a positional relationship between each point of the road boundary candidates and a neighboring point and performing clustering on the basis of an angle formed by the principal component vector and a line segment connecting the point of interest and a peripheral point.

19. The road boundary detection program according to claim 10, wherein, in the cluster reduction method, a principal component vector of a cluster of interest is calculated from a set of points included in the cluster, determines two end points from a direction of the principal component vector of the cluster of interest, determines whether or not the clusters are adjacent clusters on the basis of whether or not a foot of a perpendicular line drawn from a midpoint of a peripheral cluster to a straight line connecting the two end points of the cluster of interest is included between the two end points, and determines a cluster to be reduced on the basis of a score calculated from a length and a width of the cluster between the adjacent clusters.

20. The road boundary detection program according to claim 10, wherein a position trajectory is clustered when the point cloud data is measured on the basis of a traveling direction, and determines whether to perform straight line fitting or curved line fitting on a subset of point clouds on the basis of a position of a cluster switching point.

* * * * *